(12) United States Patent
Suetomi et al.

(10) Patent No.: US 9,847,723 B2
(45) Date of Patent: Dec. 19, 2017

(54) POWER CONVERSION DEVICE

(71) Applicant: OMRON Corporation, Kyoto (JP)

(72) Inventors: Masayuki Suetomi, Yokohama (JP); Katsuji Mitsui, Tokyo (JP); Isao Fujihata, Matsumoto (JP); Kesanobu Kuwabara, Azumino (JP); Yoshihiko Yamaguchi, Kyoto (JP); Makoto Ohashi, Uji (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/584,041

(22) Filed: May 2, 2017

(65) Prior Publication Data

US 2017/0324335 A1 Nov. 9, 2017

(30) Foreign Application Priority Data

May 9, 2016 (JP) .................................. 2016-093908
Mar. 10, 2017 (JP) .................................. 2017-045592

(51) Int. Cl.
*H02M 3/315* (2006.01)
*H02M 3/24* (2006.01)
*H02M 3/335* (2006.01)
*H02M 1/00* (2006.01)

(52) U.S. Cl.
CPC ............... *H02M 3/24* (2013.01); *H02M 1/00* (2013.01); *H02M 2001/0009* (2013.01); *H02M 2001/0025* (2013.01); *H02M 2001/0041* (2013.01)

(58) Field of Classification Search
CPC ...... H02M 3/315; H02M 3/24; H02M 3/3155; H02M 3/335; H02M 3/33507; H02M 3/33523; H02M 3/33538; H02M 3/33546; H02M 3/33569; H02M 3/33576; H02M 3/33584; H02M 1/00
See application file for complete search history.

(56) References Cited

U.S. PATENT DOCUMENTS

| 9,356,523 | B2* | 5/2016 | Yoshida | ............ | H02M 3/33576 |
| 9,450,499 | B2* | 9/2016 | Takagi | ............. | H02M 3/33584 |
| 2010/0052423 | A1* | 3/2010 | Shimada | ........... | H02M 3/33507 |
| | | | | | 307/43 |

(Continued)

FOREIGN PATENT DOCUMENTS

JP 2015-517788 6/2015

*Primary Examiner* — Adolf Berhane
*Assistant Examiner* — Sisay G Tiku
(74) *Attorney, Agent, or Firm* — JCIPRNET

(57) ABSTRACT

A power conversion device, which includes an insulation type full bridge converter and can switch a power transmission direction at a high speed, is provided. A DC/DC converter (10) constitutes a power conversion device, which operates as a first type converter that converts a voltage within a first range applied to a first input/output terminal pair into a voltage within a second range and outputs the voltage from a second input/output terminal pair or a second type converter that converts a voltage within the second range applied to the second input/output terminal pair into a voltage within the first range and outputs the voltage from the first input/output terminal pair, as a device that performs a predetermined state transition of the DC/DC converter (10) after waiting for a load current value of a primary or secondary side of a transformer (TR) becomes a value within a predetermined current value range.

4 Claims, 16 Drawing Sheets

(56) References Cited

U.S. PATENT DOCUMENTS

| | | | |
|---|---|---|---|
| 2013/0308344 A1* | 11/2013 | Rosado | H02M 3/33584 363/17 |
| 2014/0133187 A1* | 5/2014 | Hirano | H02M 3/33592 363/17 |
| 2015/0015181 A1* | 1/2015 | Kondo | H02M 3/33584 320/103 |
| 2015/0138840 A1* | 5/2015 | Muto | H02M 3/33592 363/17 |
| 2016/0087545 A1* | 3/2016 | Higaki | H02J 7/0054 363/17 |
| 2017/0237354 A1* | 8/2017 | Takahara | H02M 3/33546 363/17 |

* cited by examiner

POWER CONVERSION DEVICE

CROSS-REFERENCE TO RELATED APPLICATION

This application claims the priority benefits of Japan application serial no. 2016-093908, filed on May 9, 2016 and Japan application serial no. 2017-045592, filed on Mar. 10, 2017. The entirety of each of the above-mentioned patent applications is hereby incorporated by reference herein and made a part of this specification.

BACKGROUND OF THE INVENTION

Field of the Invention

The present invention relates to a power conversion device, and more particularly to a power conversion device having a function of converting a voltage within a first range applied to a first input/output terminal pair into a voltage within a second range and outputting the voltage from a second input/output terminal pair and a function of converting a voltage within the second range applied to the second input/output terminal pair into a voltage within the first range and outputting the voltage from the first input/output terminal pair.

Description of Related Art

As a bidirectional DC/DC converter in which large-capacity bidirectional DC conversion is possible, an insulation type bidirectional DC/DC converter (see, for example, Published Japanese Translation No. 2015-517788 of the PCT International Publication) having a configuration in which two full bridge circuits are connected via a transformer is known.

PRIOR ART DOCUMENT

Patent Document

[Patent Document 1] Japanese Unexamined Patent Application Publication No. 2015-517788

SUMMARY OF THE INVENTION

If the insulation type bidirectional DC/DC converter (hereinafter referred to as insulation type full bridge converter) having the above configuration performs a step-up operation or a step-down operation, ON/OFF of four switching elements in a full bridge circuit of a primary side is controlled so that a state in which a direction of a current flowing through a winding of the primary side of the transformer is a first direction and a state in which a direction of a current is a second direction opposite to the first direction alternate. Transition timings between the above-described two states are determined irrespective of an amount (magnitude) of the current flowing through the primary side/secondary side. Thus, if a power transmission direction from the insulation type full bridge converter is switched (if input/output terminals previously functioning as input terminals function as output terminals), it is necessary to wait for a certain period of time for protection of an element in the converter or the like.

The present invention has been made in view of the above-described circumstances, and an objective of the present invention is to provide a power conversion device which includes an insulation type full bridge converter and can switch a power transmission direction at a high speed (in a short time).

In order to achieve the above-described objective, a power conversion device of a first aspect of the present invention includes a first input/output terminal pair; a second input/output terminal pair; a DC/DC converter connected to the first input/output terminal pair and the second input/output terminal pair; and a control unit configured to control the DC/DC converter. The DC/DC converter of the power conversion device of the present invention includes a first switching leg having first and second switching elements connected in series via a first connection point and connected to the first input/output terminal pair; a second switching leg having third and fourth switching elements connected in series via a second connection point and connected in parallel to the first switching leg; a third switching leg having fifth and seventh switching elements connected in series via a third connection point and connected to the second input/output terminal pair; a fourth switching leg having sixth and eighth switching elements connected in series via a fourth connection point and connected in parallel to the third switching leg; a first energy storage and conversion unit connected to the first connection point and the second connection point and connected to one winding of a transformer and a first reactor connected in series; and a second energy storage and conversion unit connected to the third connection point and the fourth connection point and connected to the other winding of the transformer and a second reactor connected in series. Also, the control unit is configured to be able to execute a first control for causing the DC/DC converter to convert a voltage within a first range applied to the first input/output terminal pair into a voltage within a second range and to output the voltage within the second range from the second input/output terminal pair and a second control for causing the DC/DC converter to convert a voltage within the second range applied to the second input/output terminal pair into a voltage within the first range and to output the voltage within the first range from the first input/output terminal pair.

The first control capable of being executed by the control unit is a control for controlling ON/OFF of each switching element in the DC/DC converter so that a state of the DC/DC converter iteratively transitions between, in an order of, a first state in which a current input from the first input/output terminal pair flows through the first reactor, a second state in which a current is able to circulate along a path including the first reactor, a third state in which the current input from the first input/output terminal pair flows through the first reactor in a direction opposite to a direction in the first state, and a fourth state in which a current is able to circulate along a path including the first reactor while flowing through the first reactor in a direction opposite to a direction in the second state, and is a control for causing the state of the DC/DC converter to transition from the second state to the third state after a second reactor current value, which is a result of measuring a value of a current flowing through the second reactor, is within a first current value range if the second reactor current value is not within the first current value range when the state of the DC/DC converter is to be transitioned from the second state to the third state and causing the state of the DC/DC converter to transition from the fourth state to the first state after the second reactor current value is within the first current value range if the second reactor current value is not within the first current value range when the state of the DC/DC converter is to be transitioned from the fourth state to the first state. Also, the second control is a control for controlling ON/OFF of each switching element in the DC/DC converter so that a state of the DC/DC converter iteratively transitions between, in an order of, a fifth state in which a current input from the second input/output terminal pair flows through the second reactor and no current is output from the first input/output terminal pair, a sixth state in which the current input from the second input/output terminal pair flows through the second reactor and a current is output from the first input/output terminal pair, a seventh state in which no current is input from the second input/output terminal pair and no current is output from the first input/output terminal pair, an eighth state in which the current input from the second input/output terminal pair flows through the second reactor in a direction opposite to a direction in the fifth state and no current is output from the first input/output terminal pair, a ninth state in which the current input from the second input/output terminal pair flows through the second reactor in a direction opposite to a direction in the sixth state and a current is output from the first input/output terminal pair, and a tenth state in which no current is input from the second input/output terminal pair and no current is output from the first input/output terminal pair, and is a control for causing the state of the DC/DC converter to transition from the sixth state to the seventh state after a load current value, which is a value of a current flowing through the first reactor, obtained from the second reactor current value is within a second current value range if the load reactor current value is not within the second current value range when the state of the DC/DC converter is to be transitioned from the sixth state to the seventh state and causing the state of the DC/DC converter to transition from the ninth state to the tenth state after the load current value is within the second current value range if the load current value is not within the second current value range when the state of the DC/DC converter is to be transitioned from the ninth state to the tenth state.

That is, for the DC/DC converter, it is effective to reduce a load current value at the time of transition from the second state to the third state, a load current value at the time of transition from the fourth state to the first state, a load current value at the time of transition from the sixth state to the seventh state, and a load current value at the time of transition from the ninth state to the tenth state, so as to improve a speed of switching a power transmission direction of the power conversion device in which the first control for causing the state of the DC/DC converter to iteratively transition between the first to fourth states and the second control for causing the state of the DC/DC converter to iteratively transition between the fifth to tenth states are performed. According to the power conversion device of the present invention having the above-described configuration, it is possible to reduce the load current value at each transition time. Therefore, according to the power conversion device of the first aspect of the present invention, the power transmission direction can be switched at a higher speed (in a shorter time) as compared with a power conversion device in which the transition timing to various states is fixed.

A power conversion device of a second aspect of the present invention is obtained by modifying the power conversion device of the first aspect so that a transition timing is adjusted on the basis of a result of measuring a value of a current flowing through the first reactor instead of the second reactor. Accordingly, the power conversion device of the second aspect of the present invention can switch the power transmission direction at a high speed (in a short time) as compared with a power conversion device in which the transition timing to various states is fixed.

The generation of the load current value in the power conversion device of each aspect of the present invention may be performed in software. Also, the control unit of the power conversion device of the first aspect of the present invention includes a load current value output circuit configured to generate the load current value from the second reactor current value, an input voltage to the first input/output terminal, and a control period of the second control and output the load current value, so that the generation of the load current value may be performed according to software. The control unit of the power conversion device of the second aspect of the present invention may include a load current value output circuit configured to generate the load current value from the first reactor current value, an input voltage to the second input/output terminal, and a control period of the first control and output the load current value.

According to the present invention, it is possible to provide a power conversion device which includes an insulation type full bridge converter and can switch a power transmission direction at a high speed (in a short time).

DETAILED DESCRIPTION OF THE INVENTION

Hereinafter, embodiments of the present invention will be described with reference to the drawings.

Figure 1:
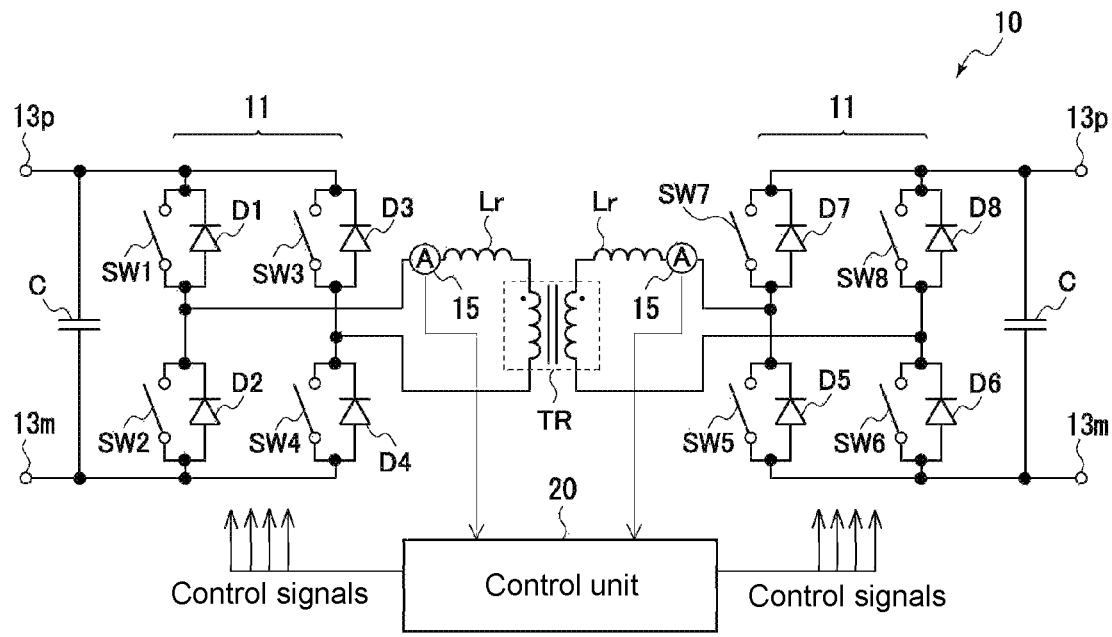
FIG. 1 is a schematic configuration diagram of a power conversion device according to an embodiment of the present invention.

FIG. 1 is a schematic configuration diagram of a power conversion device according to an embodiment of the present invention.

The power conversion device according to the present embodiment is a device in which bidirectional power conversion is possible. As illustrated, the power conversion device includes a DC/DC converter 10, a control unit 20, and two pairs of input/output terminals 13 (13$p$ and 13$m$). In any pair of input/output terminals 13, the input/output terminal 13$p$ is an input/output terminal of a high potential side and the input/output terminal 13$m$ is an input/output terminal of a low potential side.

The DC/DC converter 10 is an insulation type bidirectional DC/DC converter including a transformer TR, two reactors Lr, and two full bridge circuits 11 as main components. Hereinafter, the full bridge circuit 11 on the left side and the full bridge circuit 11 on the right side in FIG. 1 are referred to as a first full bridge circuit 11 and a second full bridge circuit 11, respectively. Likewise, the reactors Lr on the left side and the right side in FIG. 1 are referred to as a first reactor and a second reactor, respectively, and a winding on the left side and a winding on the right side in the transformer TR in FIG. 1 are referred to as a first winding and a second winding, respectively. Also, the input/output terminals 13 (13$p$ and 13$m$) on the left side and the right side in FIG. 1 are referred to as a first input/output terminal 13 and a second input/output terminal 13, respectively. The transformer TR of the DC/DC converter 10 may not have a turn ratio of 1:1. However, the configuration and operation of the power conversion device will be described below under the assumption that the turn ratio of the transformer TR is 1:1.

The first full bridge circuit 11 of the DC/DC converter 10 includes a first switching leg having a first switching element SW1 and a second switching element SW2 connected in series and a second switching leg having a third switching element SW3 and a fourth switching element SW4 connected in series. As illustrated, a diode Dn is connected in parallel between terminals of an $n^{th}$ switching element SWn (n=1 to 4) of each switching leg. Also, each switching leg is connected to a pair of first input/output terminals 13 and a connection point between the first and second switching elements SW1 and SW2 of the first switching leg is connected to one end of the first winding of the transformer TR via the first reactor. A connection point between the third and fourth switching elements SW3 and SW4 of the second switching leg is connected to the other end of the first winding of the transformer TR.

The second full bridge circuit 11 of the DC/DC converter 10 includes a third switching leg having a fifth switching element SW5 and a seventh switching element SW7 connected in series and a fourth switching leg having a sixth switching element SW6 and an eighth switching element SW8 connected in series. As illustrated, a diode Dn is connected in parallel between terminals of an $n^{th}$ switching element SWn (n=5 to 8) of each switching leg. Both the third switching leg and the fourth switching leg are connected to the second input/output terminal pair. A connection point between the fifth and seventh switching elements SW5 and SW7 of the third switching leg is connected to one end of the second winding of the transformer TR via the second reactor, and a connection point between the sixth and eighth switching elements SW6 and SW8 of the fourth switching leg is connected to the other end of the second winding of the transformer TR.

Two current sensors 15 for measuring the magnitude of the current flowing through the second reactor are attached to the DC/DC converter 10. Various sensors (not illustrated) for measuring magnitudes of an input/output voltage and an input/output current are also attached to the DC/DC converter 10.

The control unit 20 is a unit that controls the DC/DC converter 10 (ON/OFF of each switching element in the DC/DC converter 10) by changing the level of the control signal for each switching element in the DC/DC converter 10. Hereinafter, a control signal for the $n^{th}$ switching element SWn (n=1 to 8) is referred to as a control signal Gn.

The control unit 20 includes a processor (a microcontroller in the present embodiment), a gate driver, and the like, and outputs of the above-described various sensors (the current sensor 15 and the like) are input to the control unit 20.

Then, the control unit 20 determines whether to operate the DC/DC converter 10 as one of converters of the following four types on the basis of input data (a current value and a voltage value) and is configured (programmed) to control the DC/DC converter 10 so that the DC/DC converter operates as the determined converter.

A step-up converter whose first input/output terminal 13 side is the primary side.

A step-down converter whose first input/output terminal 13 side is the primary side.

A step-up converter whose second input/output terminal 13 side is the primary side.

A step-down converter whose second input/output terminal 13 side is the primary side.

Also, the control unit 20 is configured (programmed) so that a change in control details for the DC/DC converter 10 (a change from the control for causing the DC/DC converter 10 to operate as the step-up converter whose first input/output terminal 13 side is the primary side to the control for causing the DC/DC converter 10 to operate as the step-down converter whose second input/output terminal 13 side is the primary side, or the like) is immediately performed.

Hereinafter, the configuration and operation of the power conversion device according to the present embodiment will be specifically described.

First, details of basic control of the DC/DC converter 10 by the control unit 20 will be described. Also, control signals G1 to G6 (whose details will be described below) are actually configured so that ON and OFF of the two switching elements (ON of the first switching element SW1, OFF of the second switching element SW2, and the like) are performed with a time difference (so-called dead time). However, the operation of the control unit 20 will be described below under the assumption that the time difference is not assigned to avoid complicated explanation.

Figure 2:
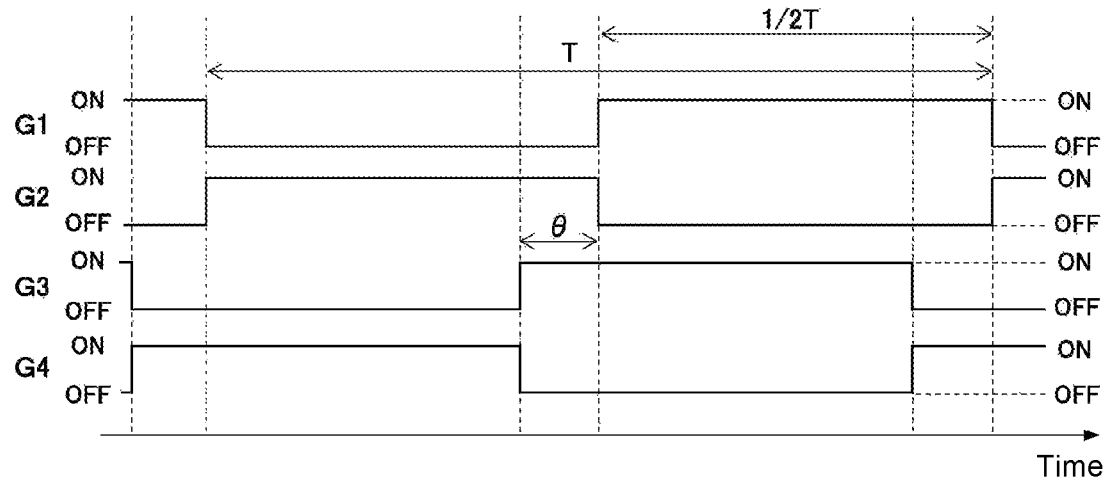
FIG. 2 is a timing chart of output control signals G1 to G4 when a control unit provided in the power conversion device according to the embodiment causes a DC/DC converter to operate as a step-down converter whose first input/output terminal side is a primary side.

(1) When the DC/DC converter 10 functions as a step-down converter whose first input/output terminal 13 side is primary side:

In this case, the control unit 20 basically outputs the control signals G1 to G4 which change with time as illustrated in FIG. 2.

In other words, when the DC/DC converter 10 functions as the step-down converter whose first input/output terminal 13 side is the primary side, the control unit 20 outputs the control signal G1 whose ON time is ½ of a period T, i.e., the control signal G1 having a duty ratio of ½. Also, the control unit 20 outputs the control signal G2 obtained by inverting the control signal G1, i.e., the control signal G2 by which the second switching element SW2 is turned OFF/ON when the first switching element SW1 is ON/OFF. Further, the control unit 20 outputs the control signal G3 whose phase is shifted by θ from the control signal G1 and the control signal G4 obtained by inverting the control signal G3.

Then, while the control signals G1 to G4 as described above are output, the control unit 20 changes the value of θ so that the output voltage or the output current of the DC/DC converter 10 become a target value.

Also, when the power conversion device according to the present embodiment operates as the step-down device whose first input/output terminal 13 side is the primary side, the second full bridge circuit 11 (the full bridge circuit 11 of the secondary side; see FIG. 1) is used as a full wave rectifier (diode bridge circuit). Accordingly, when the DC/DC converter 10 is operated as the step-down converter whose first input/output terminal 13 side is the primary side, the control unit 20 maintains the state of each switching element in the second full bridge circuit 11 in an OFF state.

Figure 3:
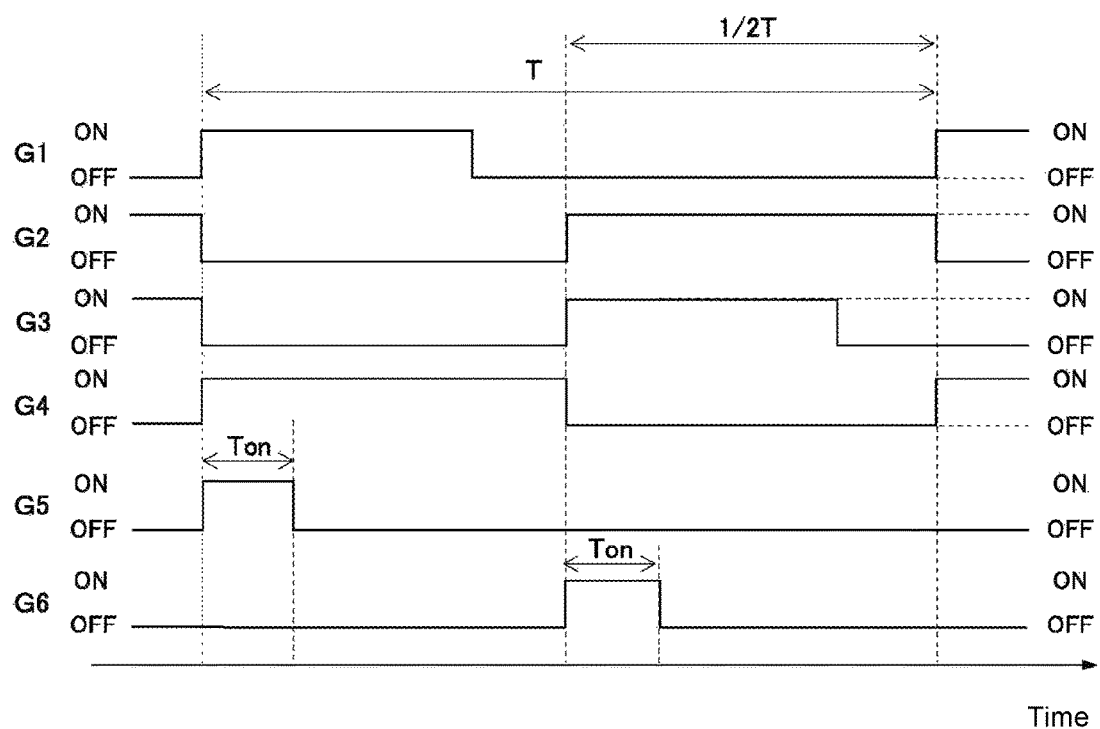
FIG. 3 is a timing chart of output control signals G1 to G6 when the control unit causes the DC/DC converter to operate as a step-up converter whose first input/output terminal side is a primary side.

(2) When the DC/DC converter 10 functions as a step-up converter whose first input/output terminal 13 side is primary side:

In this case, the control unit 20 basically outputs the control signals G1 to G6 which change with time as illustrated in FIG. 3.

In other words, when the DC/DC converter 10 functions as the step-up converter whose first input/output terminal 13 side is the primary side, the control unit 20 outputs the control signal G2 having a duty ratio of ½ and the control signal G1 which rises at a falling edge time of the control signal. G2 and has a shorter ON time than the control signal G2. Also, the control unit 20 outputs the control signals G3 and G4, which are signals obtained by delaying the control signals G1 and G2 by T/2, respectively. Further, the control unit 20 outputs the control signal G5 having a high level only during a time Ton from the falling edge time of the control signal G1 and the control signal G6 having a high level only during the time Ton from the falling edge time of the control signal G3.

Then, while the control signals G1 to G6 as described above are output, the control unit changes a value of the time Ton so that the output voltage or the output current of the DC/DC converter 10 becomes the target value.

Hereinafter, details of control of the DC/DC converter 10 by the control unit 20 will be more specifically described.

An operation of the control unit 20 when the DC/DC converter 10 functions as the step-down converter whose first input/output terminal 13 side is the primary side will be described.

Figure 4:
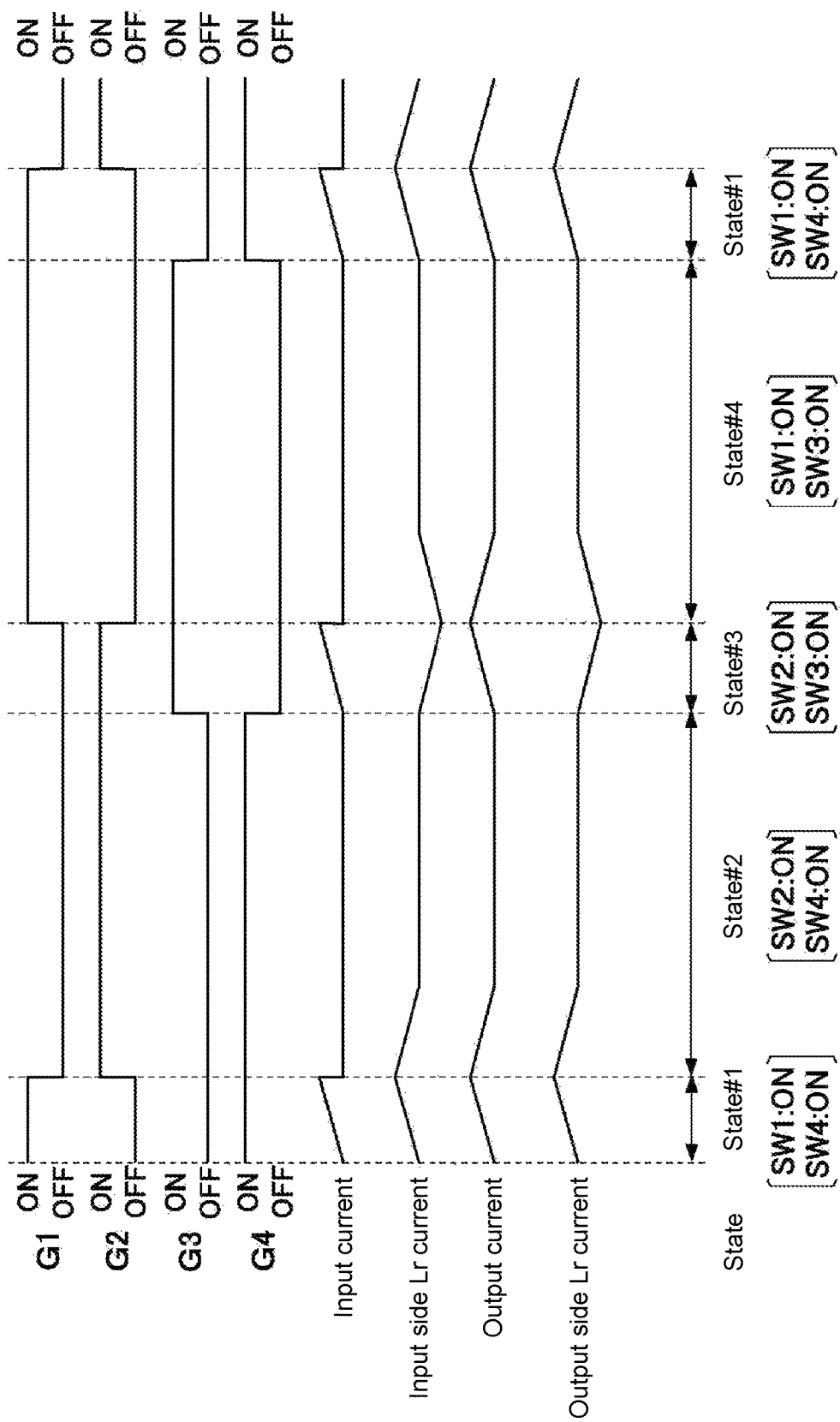
FIG. 4 is a time chart illustrating changes in currents flowing through parts of the DC/DC converter with respect to time when the control unit causes the DC/DC converter 10 to function as a step-down converter whose first input/output terminal side is the primary side together with changes in the control signals G1 to G4 with respect to time.

FIG. 4 illustrates changes in currents flowing through parts of the DC/DC converter 10 with respect to time when the control unit 20 causes the DC/DC converter 10 to function as the step-down converter whose first input/output terminal 13 side is the primary side together with changes in the control signals G1 to G4 with respect to time. Also, FIGS. 5A to 5F are explanatory diagrams illustrating current paths of a primary side and a secondary side of the DC/DC converter 10 when the control unit 20 causes the DC/DC converter 10 to function as the step-down converter whose first input/output terminal 13 side is the primary side. Also, in FIG. 4 and FIG. 8 described below, an "input current" and an "output current" are a current flowing into the first input/output terminal 13p and a current flowing out from the second input/output terminal 13p, respectively. Also, an "input side Lr current" and an "output side Lr current" are a current flowing through the first reactor (the reactor Lr of the primary side) and a current flowing through the second reactor (the reactor Lr of the secondary side).

As described above, if the DC/DC converter 10 is operated as the step-down converter whose first input/output terminal 13 side is the primary side, the control unit 20 outputs the control signals G1 to G4 that change with time as illustrated in FIG. 4.

Accordingly, if the control unit 20 operates the DC/DC converter 10 as the step-down converter whose first input/output terminal 13 side is the primary side, the state of the DC/DC converter 10 iteratively transitions in the order of state #1, state #2, state #3, and state #4 between the following four states.

State #1: a state in which the first switching element SW1 and the fourth switching element SW4 are ON (the first switching element SW1 and the fourth switching element SW4 are ON and the other switching elements are OFF; this is the same in the following).

State #2: a state in which the second switching element SW2 and the fourth switching element SW4 are ON.

State #3: a state in which the second switching element SW2 and the third switching element SW3 are ON.

State #4: a state in which the first switching element SW1 and the third switching element SW3 are ON.

Figure 5A:
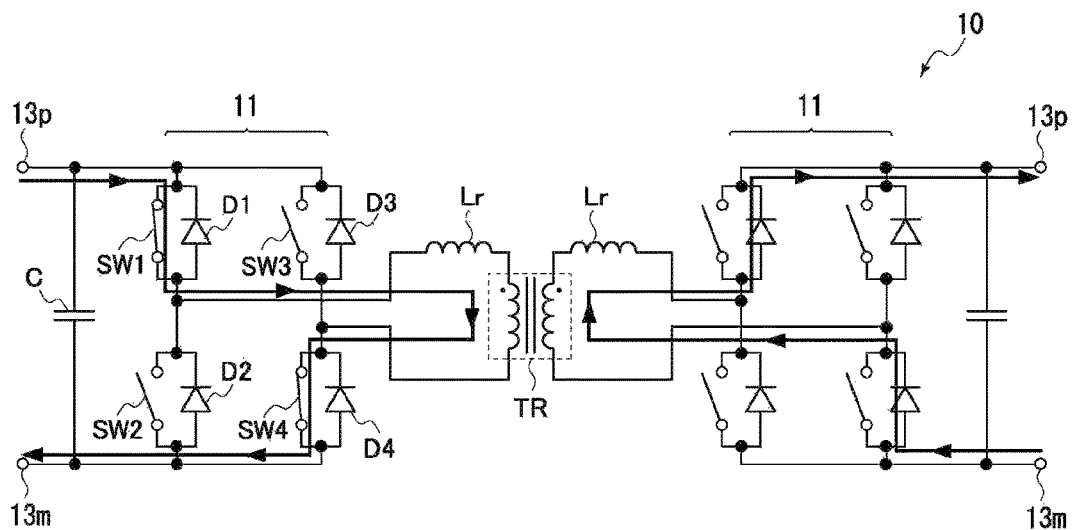
FIG. 5A is an explanatory diagram illustrating current paths of a primary side and a secondary side of the DC/DC converter when the control unit causes the DC/DC converter to function as a step-down converter whose first input/output terminal side is the primary side.

When the state of the DC/DC converter 10 is in state #1, as illustrated in FIG. 5A, a current flows through a path of first input/output terminal 13p→first switching element SW1→first reactor→transformer TR fourth switching element SW4→first input/output terminal 13m. Accordingly, energy is stored in the first reactor and the input side Lr current rises as illustrated in FIG. 4. Also, energy is transmitted to the secondary side via the transformer TR and rectified by the second full bridge circuit 11 and output from the second input/output terminal 13 as illustrated in FIGS. 4 and 5A.

Figure 5B:
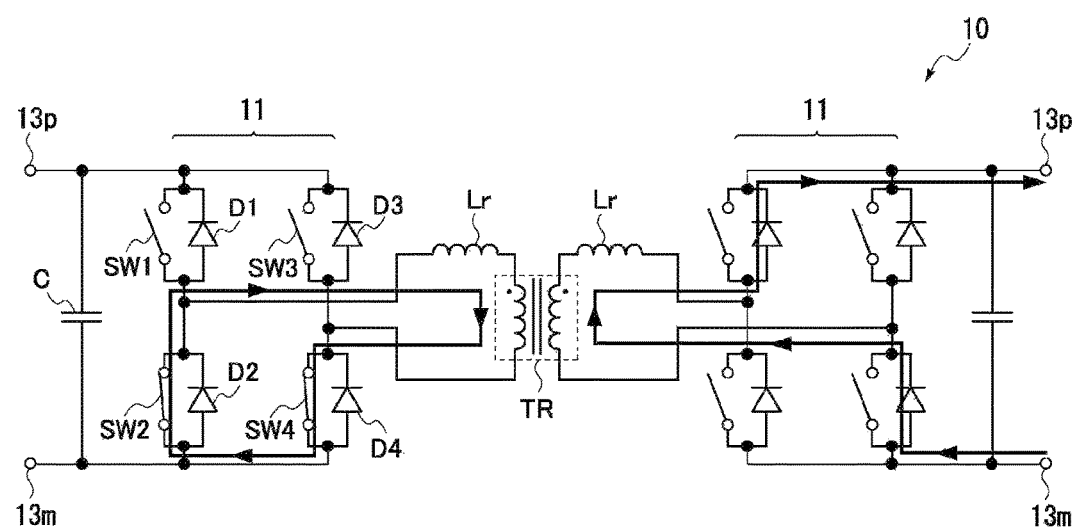
FIG. 5B is an explanatory diagram of the current paths of the primary side and the secondary side of the DC/DC converter following FIG. 5A.

When the state of the DC/DC converter 10 transitions to state #2, the first switching element SW1 is OFF and the second switching element SW2 is ON. Accordingly, as illustrated in FIG. 5B, a current circulates along a path of second switching element SW2 (and diode D2)→first reactor→transformer TR→fourth switching element SW4 according to energy stored in the first reactor. As a result, the energy stored in the first reactor is transmitted to the secondary side, rectified by the second full bridge circuit 11, and output from the second input/output terminal 13.

Figure 5C:
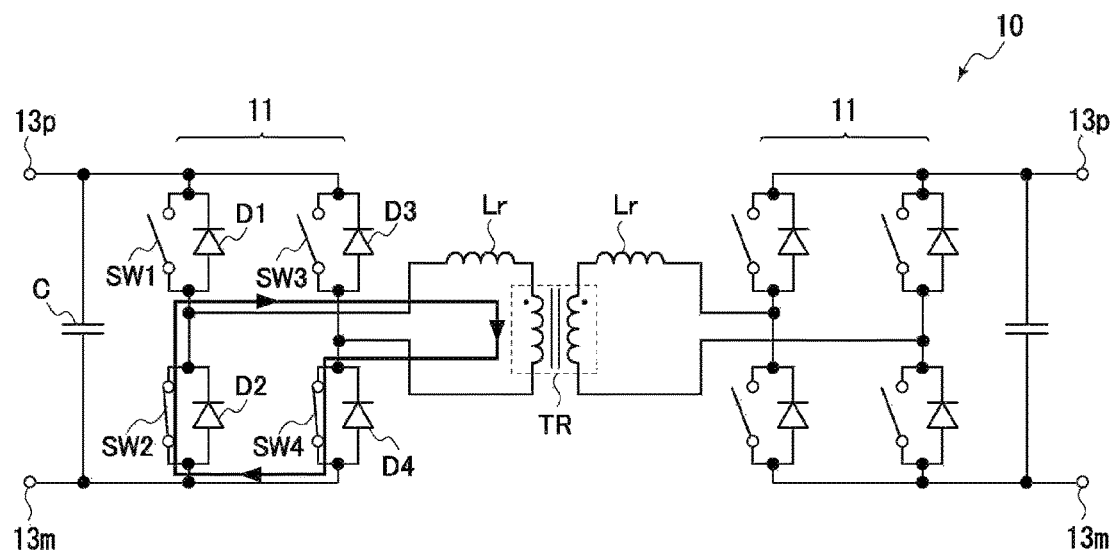
FIG. 5C is an explanatory diagram of the current paths of the primary side and the secondary side of the DC/DC converter following FIG. 5B.

The magnitude of the circulating current in state #2 decreases with the movement of the energy stored in the first reactor to the secondary side. Therefore, when a certain time (time corresponding to the θ value) has elapsed after the transition to state #2, as illustrated in FIG. 5C, a state where no current flows through the second reactor is formed. Also, when a magnitude of a load current of the secondary side of the transformer TR (i.e., a current flowing through the second reactor) is "0," a magnitude of a load current of the primary side of the transformer TR is also "0." Because the current flowing through the primary side of the transformer TR is load current+excitation current, a current circulating through the primary side of the DC/DC converter 10 is the excitation current in FIG. 5C.

The DC/DC converter 10 is configured as in the state illustrated in FIG. 5C in principle (if a load is not excessively large) when the original timing of transition to state #3 has been reached. Here, the original transition timing is a transition timing when a timing adjustment function (of which details will be described below) provided in the control unit 20 is not working.

Figure 5D:
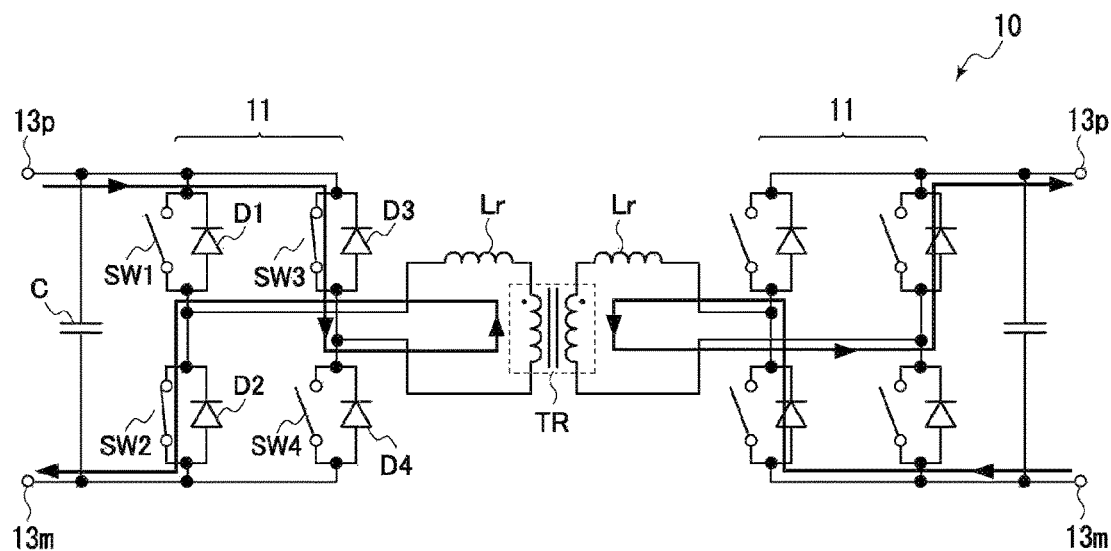
FIG. 5D is an explanatory diagram of the current paths of the primary side and the secondary side of the DC/DC converter following FIG. 5C.

When the state of the DC/DC converter 10 is state #3 (i.e., when SW2 and SW3 are ON), as illustrated in FIG. 5D, a current flows through a path of first input/output terminal 13p→third switching element SW3→transformer TR→first reactor→second switching element SW2→first input/output terminal 13m. In other words, a current flows through the first reactor in a direction opposite to that in a case in which the state of the DC/DC converter 10 is state #1 (FIG. 5A).

Accordingly, energy is stored in the first reactor (see FIG. 4) and energy is transmitted to the secondary side via the transformer TR, rectified by the second full bridge circuit 11, and output from the second input/output terminal 13.

Figure 5E:
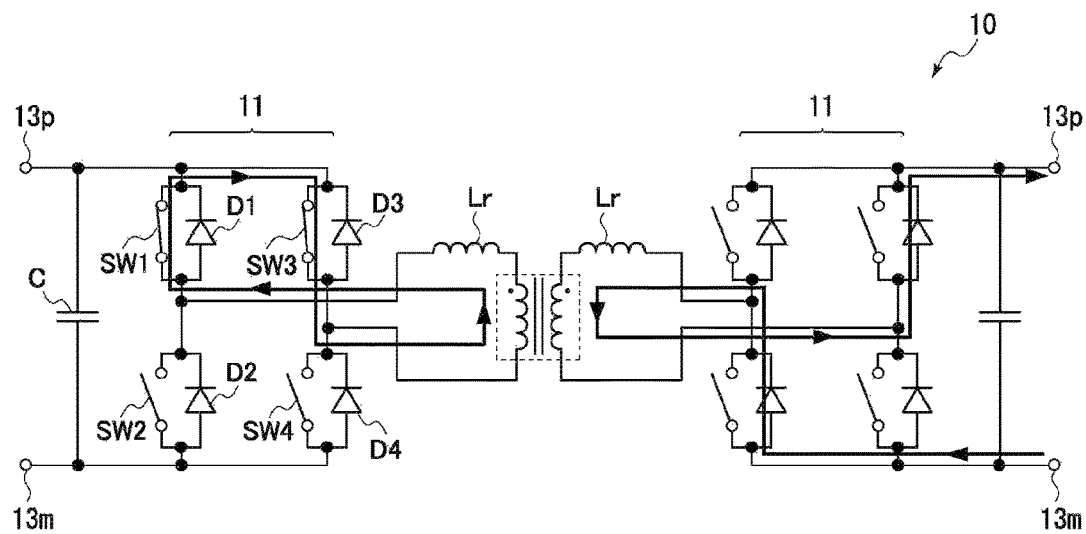
FIG. 5E is an explanatory diagram of the current paths of the primary side and the secondary side of the DC/DC converter following FIG. 5D.

When the primary side circuit of the DC/DC converter 10 transitions from state #3 to state #4, as illustrated in FIG. 5E, a current circulates along a path of third switching element SW3→transformer TR→first reactor→first switching element SW1 (and diode D1) according to the energy stored in the first reactor. Thus, the energy stored in the first reactor is transmitted to the secondary side.

Figure 5F:
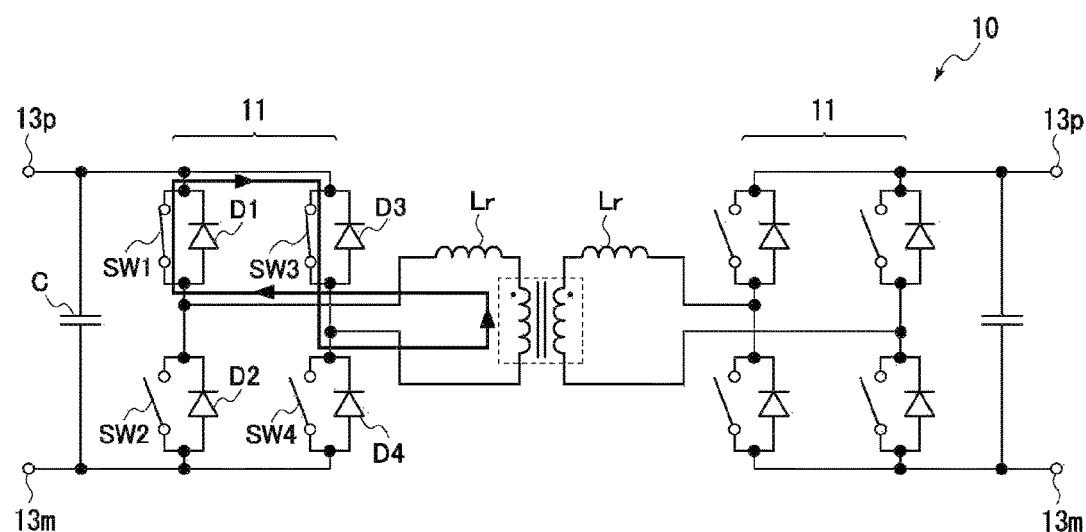
FIG. 5F is an explanatory diagram of the current paths of the primary side and the secondary side of the DC/DC converter following FIG. 5E.

The magnitude of the circulating current in this state #4 also decreases with movement of energy stored in the first reactor to the secondary side. When a certain time has elapsed after the transition to state #4, as illustrated in FIG. 5F, a state in which no current flows through the second reactor, i.e., a state in which load currents of the primary side and the secondary side do not flow, is formed. Even when the original timing of transition from state #4 to state #1 has been reached, the DC/DC converter 10 is configured to make the state be a state illustrated in FIG. 5F in principle.

Because the current flowing through the primary side of the transformer TR is load current+excitation current, a current circulating through the primary side of the DC/DC converter 10 is the excitation current in FIG. 5F.

As described above, when the original timing of transition from the state (state #2, state #4, or the like) in which the current circulates in the circuit on the primary side to a next state has been reached, the DC/DC converter 10 is configured so that the magnitude of the second reactor current becomes "0." However, it is difficult to configure the DC/DC converter 10 so that the above-described condition is satisfied without degrading the performance of the power conversion device in all operation conditions of the power conversion device.

Figure 6:
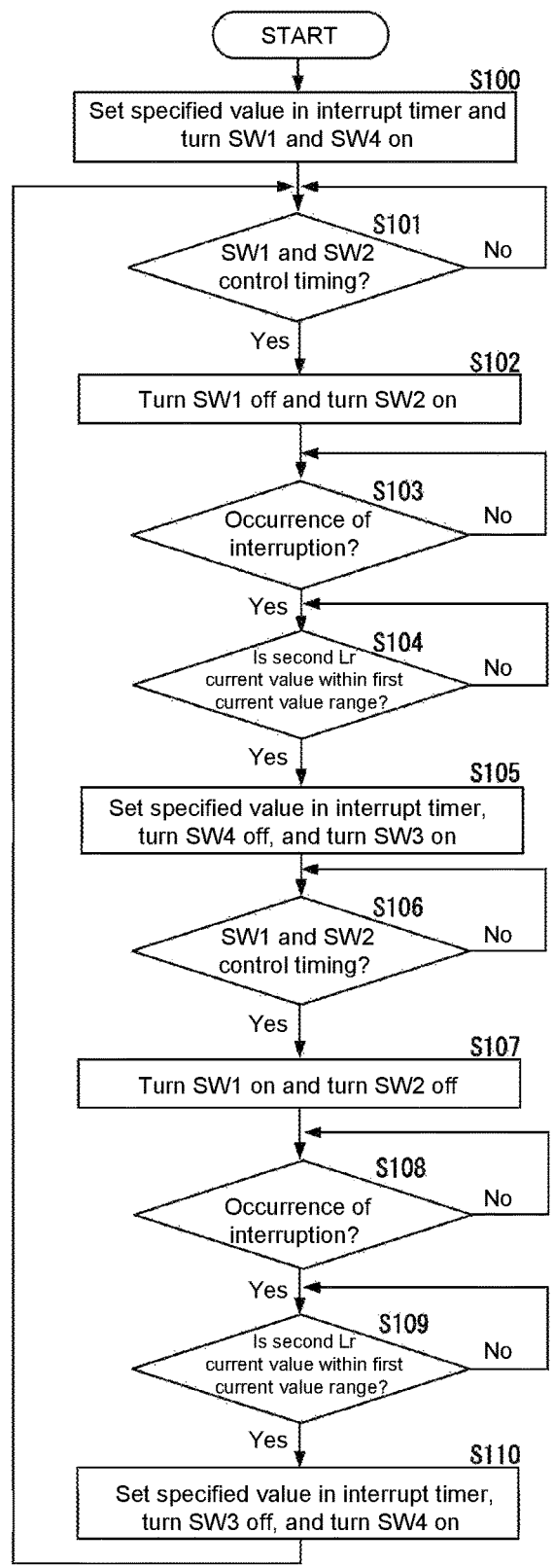
FIG. 6 is a flowchart of a step-down control process executed by the control unit.

Thus, when the control unit 20 (the microcontroller in the control unit 20) causes the DC/DC converter 10 to operate as the step-down converter whose first input/output terminal 13 side is the primary side, the control unit 20 is configured (programmed) so as to perform the step-down control process of a procedure illustrated in FIG. 6.

That is, the control unit 20 that started the step-down control process first performs a timer setting process of setting a specified value in an interrupt timer in step S100. Here, the interrupt timer is a timer that generates an interruption when a time according to a set value has elapsed. Also, a specified value is a value at which the interrupt timer will generate an interruption after the passage of time T/2 (T is a period of the control signal: see FIG. 2) if the value is set.

Further, in step S100, the control unit 20 also performs a process of turning the first switching element SW1 and the fourth switching element SW4 ON by changing the levels of the control signals G1 and G4 to a high level.

Upon completion of the processing of step S100, the control unit 20 waits (monitors) an SW1 and SW2 control timing in step S101. Here, the SW1 and SW2 control timing is a timing determined by a θ value to control (change) the ON/OFF states of the first switching element SW1 and the second switching element SW2. The processing of step S101 to be first executed after the start of the step-down control process may be performed irrespective of the θ value (e.g., a process of determining that the SW1 and SW2 control timing has been reached when a predetermined time has elapsed from a time point at which step S100 was executed). Also, the processing of step S101 of the second and subsequent times may be a process of determining whether or not the SW1 and SW2 control timing has been reached on the basis of an elapsed time after the occurrence of an interruption or a process of determining whether or not the SW1 and SW2 control timing has been reached on the basis of an elapsed time after the first switching element SW1 was previously turned ON.

When the SW1 and SW2 control timing has been reached (step S101; YES), the control unit 20 changes the levels of the control signals G1 and G2 to turn the first switching element SW1 OFF and turn the second switching element SW2 ON (step S102). In this step S102, the control unit 20 assigns a time difference to ON/OFF of the first switching element SW1 and the second switching element SW2 to suppress a through-current. More specifically, the control unit 20 changes the level of the control signal G2 when a predetermined time has elapsed after a change in the level of the control signal G1.

Thereafter, the control unit 20 waits (monitors) the occurrence of an interruption in step S103. When the interruption has occurred (step S103; YES), the control unit 20 determines whether or not a second Lr current value at the interruption time is within a first current value range (step S104). Here, the second Lr current value is a magnitude of a current flowing through the second reactor. Also, although details thereof will be described below, the first current value range is a range of a current value centered on "0."

In other words, the control unit 20 acquires a result of detecting a current value by the current sensor 15 and determines whether or not the detection result is within the first current value range in step S104.

If the second Lr current value is within the first current value range (step S104; YES), the control unit 20 sets a specified value in the interrupt timer (step S105). Also, the control unit 20 turns the fourth switching element SW4 OFF and turns the third switching element SW3 ON by changing the levels of the control signals G3 and G4 (step S105). Also, if the second Lr current value is not within the first current value range (step S104; NO), the control unit 20 waits for the second Lr current value to be a value within the first current value range by iterating the processing of step S104, and then performs the processing of S105.

Also, in step S105 and steps S107 and S110 to be described later, similar to the execution of the above-described step S102, the control unit 20 assigns a time difference to ON/OFF of the two switching elements to suppress a through-current.

Upon completion of the processing of step S105, the control unit 20 waits (monitors) the SW1 and SW2 control timing (step S106). The SW1 and SW2 control timing in this step S106 is also a timing determined by the 0 value and a Ton value to control (change) the ON/OFF states of the first switching element SW1 and the second switching element SW2. The processing of step S106 may be a process of determining whether or not the SW1 and SW2 control timing has been reached on the basis of the passage of time after the first switching element SW1 was previously turned OFF or a process of determining whether or not the SW1 and SW2 control timing has been reached on the basis of the passage of time after the occurrence of an interruption.

When the SW1 and SW2 control timing has been reached (step S106; YES), the control unit 20 changes the levels of the control signals G1 and G2 to turn the first switching element SW1 ON and turn the second switching element SW2 OFF (step S107).

Thereafter, the control unit 20 waits for occurrence of an interruption in step S108. If the interruption has occurred (step S108; YES), the control unit 20 determines whether or not the second Lr current value at an interruption time is within the first current value range (step S109).

If the second Lr current value is within the first current value range (step S109; YES), the control unit 20 sets a specified value in the interrupt timer, turns the third switching element SW3 OFF, and turns the fourth switching element SW4 ON (step S110). Also, if the second Lr current value is not within the first current value range, the control unit 20 waits for the second Lr current value to be within the first current value range, and then performs the processing of step S110.

Then, the control unit 20 that has completed the processing of step S110 resumes step S101 and the processing subsequent thereto.

Hereinafter, details of the first current value range and the significance of the processing of steps S104 and S109 in the step-down control process (FIG. 6) will be described.

The first current value range is a determined current value range centered on "0" so that switching of a power transmission direction is enabled at a desired speed if the processing of steps S105 and S110 is performed when the second Lr current value is within the range. Normally, a range in which a width changes according to an input voltage for the power conversion device is used as the first current value range. However, the first current value range may be a fixed range.

Specifically, it is necessary for a direction of a current flowing through the transformer TR to be switched in a state in which a load current value of the primary side of the transformer TR is small during a step-down control process so that the DC/DC converter 10 can switch the power transmission direction at a high speed. In other words, it is only necessary to perform the processing of steps S105 and S110 after the load current value of the primary side of the transformer TR is small, but an excitation current also flows through the primary side of the transformer TR. Thus, if the execution timing of the processing of steps S105 and S110 is determined on the basis of a result of measuring a value of a current flowing through the primary side of the transformer TR (=load current value+excitation current value), an excitation current component is to be removed from the measurement result. On the other hand, the value of the current flowing through the secondary side of the transformer TR is a load current value of the secondary side of the transformer TR and there is a proportional relationship between load current values of the primary side and the secondary side of the transformer TR. Accordingly, it is possible to determine whether or not the load current value of the primary side of the transformer TR has reached a desired value by comparing the load current value of the secondary side of the transformer TR (the second Lr current value) and (k·desired value). Also, k is a proportionality coefficient determined by the turn ratio of the transformer ("1" if the turn ratio is 1:1).

The desired value to be compared with the load current value of the primary side of the transformer TR is a value according to a time of switching a desired power transmission direction and the direction of a load current of the secondary side of the transformer TR is different between the execution time of the processing of step S104 and the execution time of the processing of step S109. Thus, it is determined whether or not the second Lr current value is within the above-described first current value range in steps S104 and S109.

Next, an operation of the control unit 20 when the DC/DC converter 10 functions as the step-up converter whose first input/output terminal 13 side is the primary side will be described.

Figure 7:
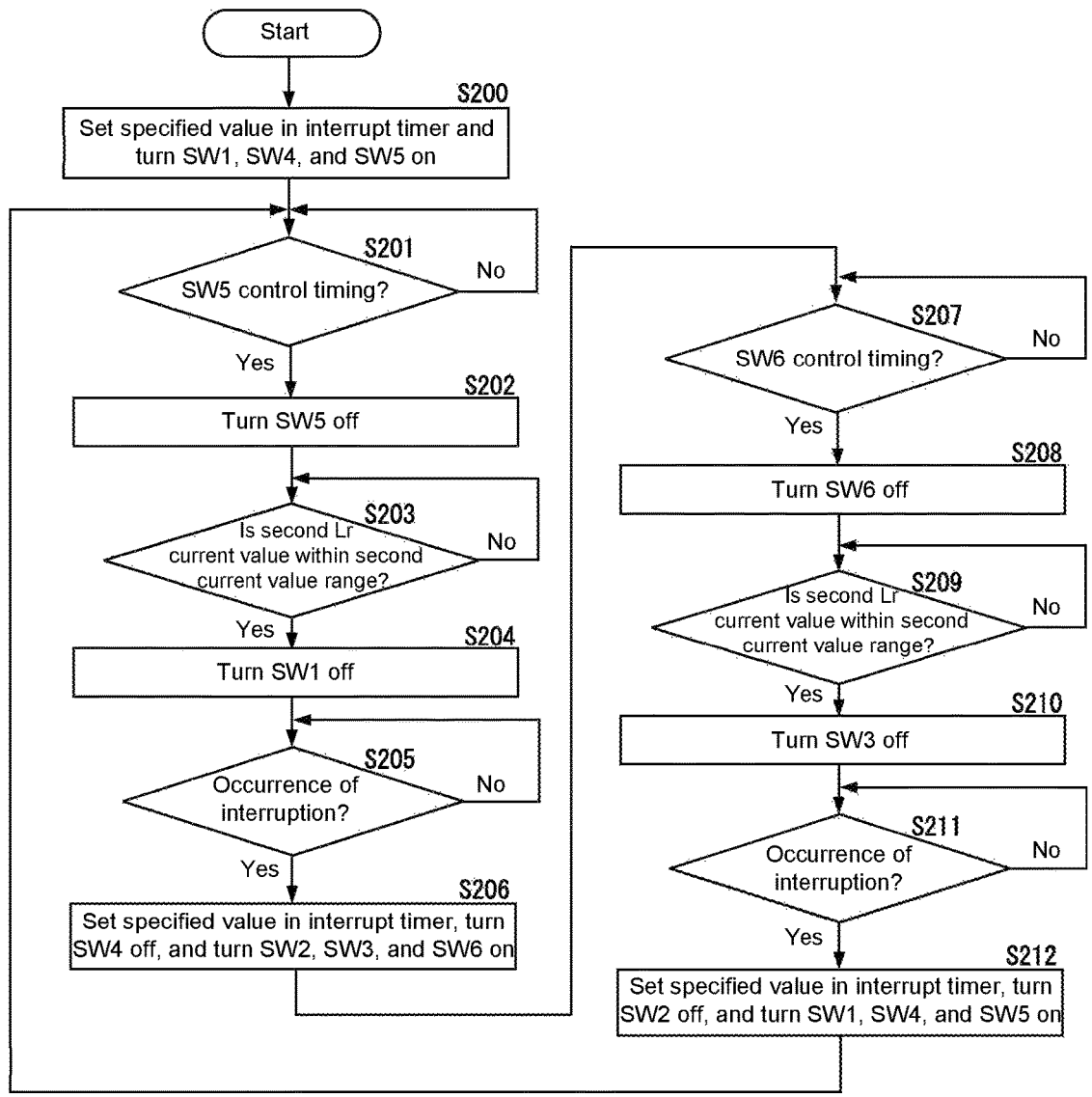
FIG. 7 is a flowchart of a step-up control processing executed by the control unit.

When the DC/DC converter 10 is operated as the step-up converter whose first input/output terminal 13 side is the primary side, the control unit 20 is configured (programmed) to perform the step-up control process of the procedure illustrated in FIG. 7.

In other words, the control unit 20 that started the step-up control process firstly sets a specified value in the interrupt timer (step S200). Also, in step S200, the control unit 20 performs a process of turning the first switching element SW1, the fourth switching element SW4, and the fifth switching element SW5 ON by changing the levels of the control signals G1, G4, and G5 to a high level.

The control unit 20 that has completed the processing of step S200 awaits (monitors) an SW5 control timing in step S201. Here, the SW5 control timing is a timing determined by the Ton value and at which the fifth switching element SW5 is to be turned OFF.

When the SW5 control timing has been reached (step S201; YES), the control unit 20 turns the fifth switching element SW5 OFF by changing the level of the control signal G5 (step S202).

Thereafter, the control unit 20 determines whether or not the second Lr current value is not within a second current value range (step S203). In other words, the control unit 20 acquires the detection result of the current value from the current sensor 15 provided on the secondary side of the DC/DC converter 10, and determines whether or not the detection result is within the second current value range (step S203). Here, the second current value range is a determined current value range centered on "0" so that the power transmission direction can be switched at a desired speed if the processing of steps S204 and S212 is performed when the second Lr current value is within the range. Normally, a range in which a width changes in accordance with a voltage input to the power conversion device is used as the second current value range. However, the second current value range may be a fixed range.

When the second Lr current value is not within the second current value range (step S203; NO), the control unit 20 iterates the processing (determination) of step S203. If the second Lr current value is within the second current value range (step S203; YES), the control unit 20 turns the first switching element SW1 OFF (step S204). Next, the control unit 20 waits for occurrence of an interruption (step S205). If the interruption has occurred (step S205; YES), the control unit 20 sets a specified value in the interruption timer, turns the fourth switching element SW4 OFF, and turns the second switching element SW2, the third switching element SW3, and the sixth switching element SW6 ON (step S206). Also, if the interruption has already occurred during the execution of step S203 (or step S204), the control unit 20 performs the processing of step S206 without waiting for the occurrence of the interruption in step S205.

The control unit 20 that has completed the processing of step S206 awaits (monitors) an SW6 control timing in step S207. Here, the SW6 control timing is a timing determined by the Ton value and at which the sixth switching element SW6 is to be turned OFF.

When the SW6 control timing has been reached (step S207; YES), the control unit 20 turns the sixth switching element SW6 OFF by changing the level of the control signal G6 (step S208).

Thereafter, the control unit 20 determines whether or not the second Lr current value is within the second current value range (step S209).

If the second Lr current value is not within the second current value range (step S209; NO), the control unit 20 iterates the processing (determination) of step S209. If the second Lr current value is within the second current value range (step S209; YES), the control unit 20 turns the third switching element SW3 OFF (step S210). Next, the control unit 20 waits for occurrence of an interruption (step S211). If the interruption has occurred (step S211; YES), the control unit 20 sets a specified value in the interruption timer, turns the second switching element SW2 OFF, and turns the first switching element SW1, the fourth switching element SW4, and the fifth switching element SW5 ON (step S212). If the interruption has already occurred during the execution of step S209 (or step S210), the control unit 20 performs the processing of step S212 without waiting for the occurrence of the interruption in step S211.

Then, the control unit 20 that has completed the processing of step S212 resumes a process of moving to step S201.

Hereinafter, details of the step-up control process will be more specifically described.

Figure 8:
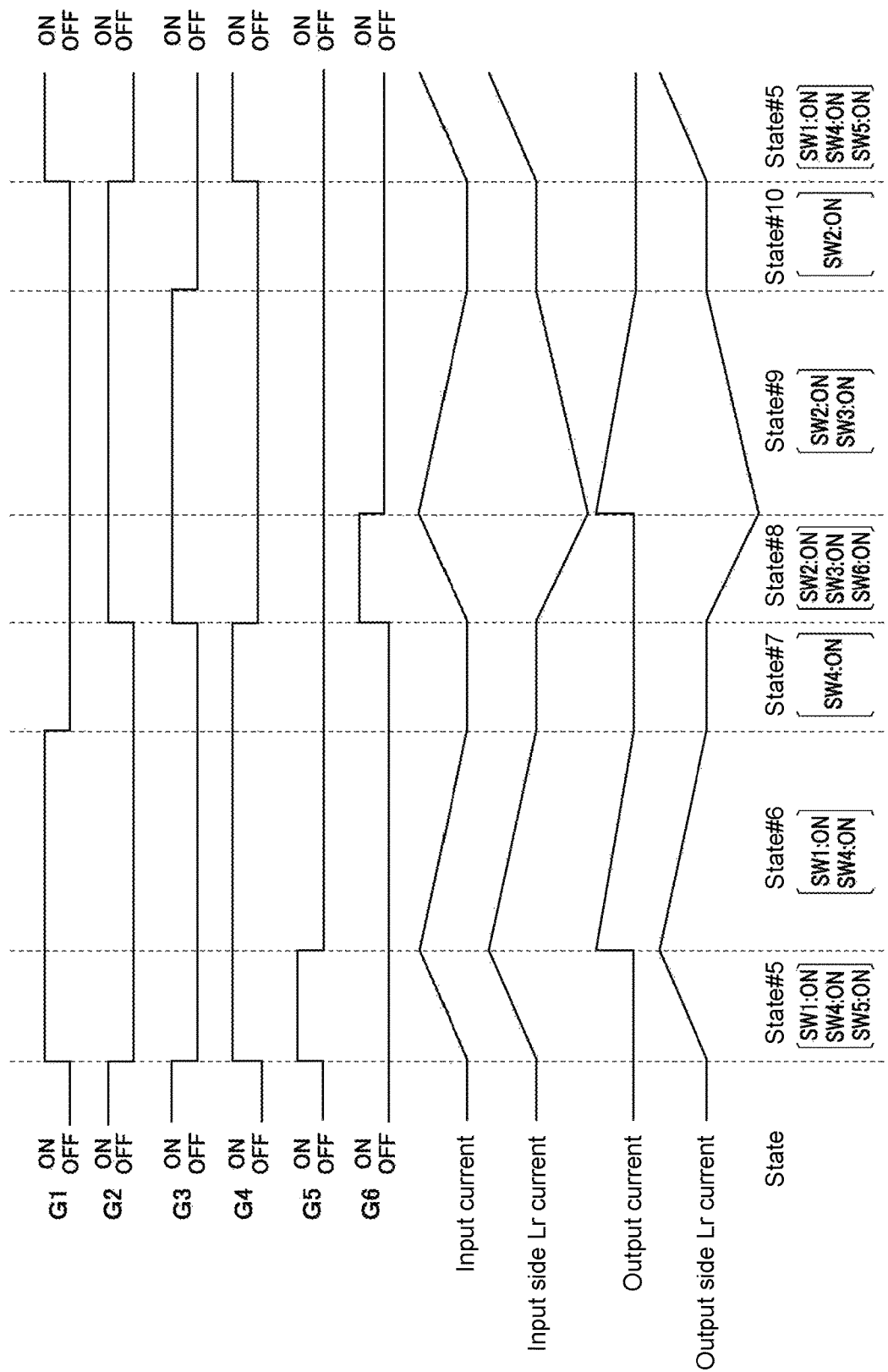
FIG. 8 is a time chart illustrating changes in currents flowing through parts of the DC/DC converter with respect to time when the control unit causes the DC/DC converter to function as a step-up converter whose first input/output terminal side is the primary side together with changes in control signals G1 to G6 with respect to time.

FIG. 8 illustrates changes in currents flowing through parts of the DC/DC converter 10 with respect to time when the control unit 20 causes the DC/DC converter 10 to function as a step-up converter whose first input/output terminal 13 side is the primary side together with changes in control signals G1 to G6 with respect to time. Also, FIGS. 9A to 9F are explanatory diagrams of current paths of a primary side and a secondary side of the DC/DC converter 10 when the control unit 20 causes the DC/DC converter 10 to function as the step-up converter whose first input/output terminal 13 side is the primary side.

When the step-up control process of the above-described details is performed, the state of the DC/DC converter 10 iteratively transitions between the following six states in the order of state #5, state #6, state #7, state #8, state #9, and state #10 (see FIG. 8).

State #5: a state in which the first switching element SW1, the fourth switching element SW4, and the fifth switching element SW5 are ON.

State #6: a state in which the first switching element SW1 and the fourth switching element SW4 are ON.

State #7: a state in which the fourth switching element SW4 is ON.

State #8: a state in which the second switching element SW2, the third switching element SW3, and the sixth switching element SW6 are ON.

State #9: a state in which the second switching element SW2 and the third switching element SW3 are ON.

State #10: a state in which the second switching element SW2 is ON.

Figure 9A:
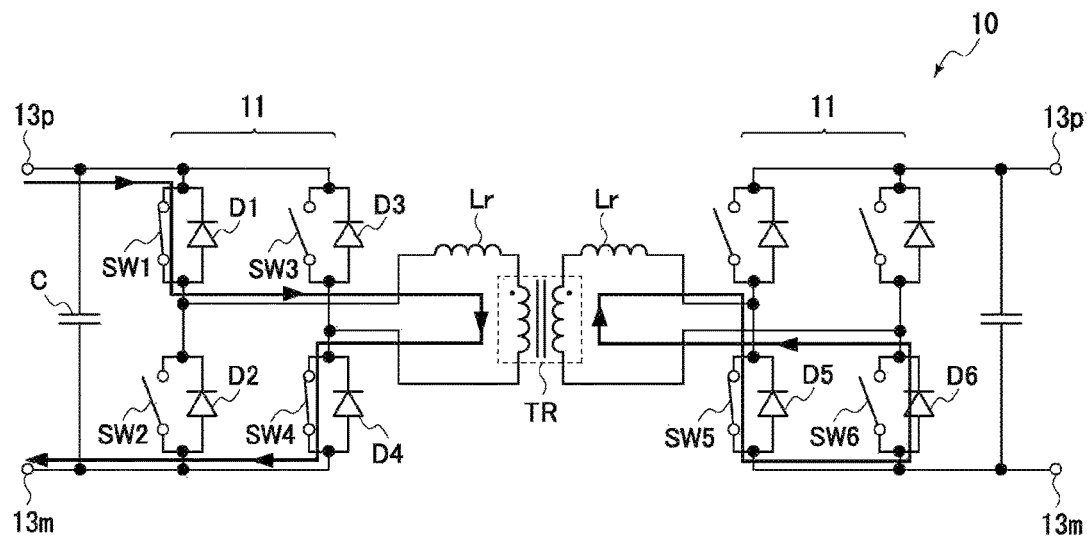
FIG. 9A is an explanatory diagram of current paths of a primary side and a secondary side of a DC/DC converter when the control unit causes the DC/DC converter to function as a step-up converter whose first input/output terminal side is the primary side.

When the state of the DC/DC converter 10 is state #5 (i.e., when SW1, SW4, and SW5 are ON), as illustrated in FIG. 9A, a current flows through a path of first input/output terminal 13p→first switching element SW1→first reactor-→transformer TR→fourth switching element SW4→first input/output terminal 13m. Accordingly, energy is stored in the first reactor and the input side Lr current rises as illustrated in FIG. 8. Also, energy is transmitted to the secondary side via the transformer TR. However, because the fifth switching element SW5 of the second full bridge circuit 11 is ON, as illustrated in FIG. 9A, a current circulates along a path of diode D6→transformer TR→second reactor→fifth switching element SW5 on the secondary side of the DC/DC converter 10 in state #5. Accordingly, energy from the primary side is not output from the second input/output terminal 13, but stored in the second reactor.

Figure 9B:
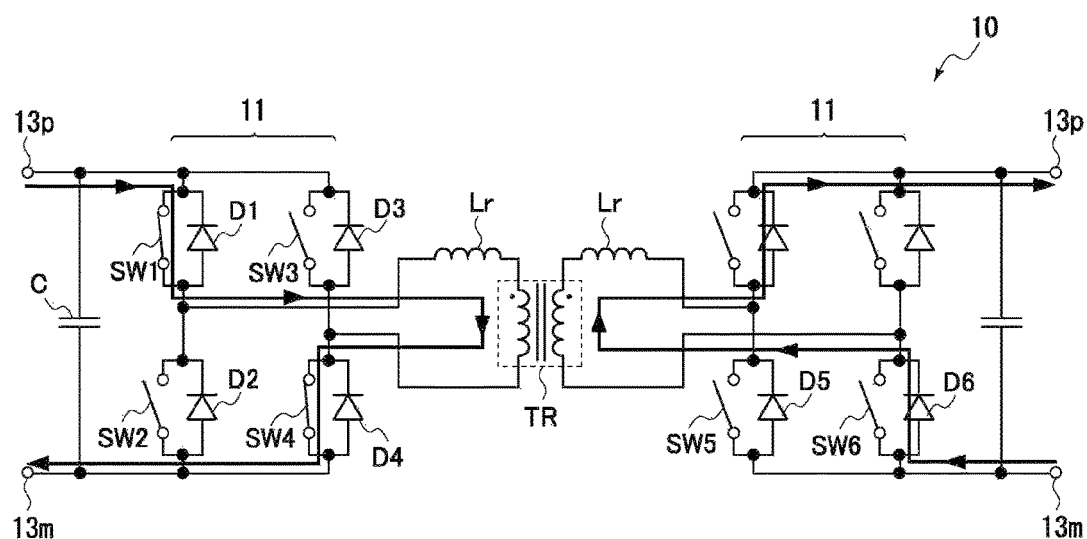
FIG. 9B is an explanatory diagram of current paths of the primary side and the secondary side of the DC/DC converter following FIG. 9A.

When the fifth switching element SW5 is OFF and the state of the DC/DC converter 10 becomes state #6, as illustrated in FIG. 9B, the energy stored in the first reactor and energy from a power supply are transmitted to the secondary side and the current rectified by the second full bridge circuit 11 is output from the second input/output terminal 13.

Figure 9C:
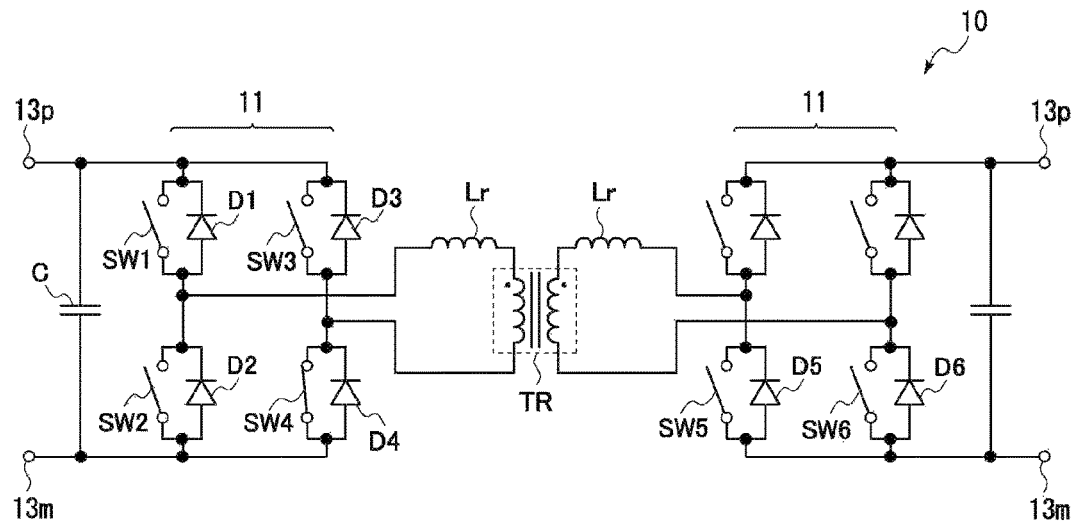
FIG. 9C is an explanatory diagram of the current paths of the primary side and the secondary side of the DC/DC converter following FIG. 9B.

Because the output voltage of the load is applied to the second input/output terminal 13, the input current, the input side Lr current, and the output current gradually decrease if the state of the DC/DC converter 10 is state #6. Then, when it is detected that the second Lr current value is within the first current value range in step S203 (FIG. 7), the first switching element SW1 is OFF and the state of the DC/DC converter 10 transitions to state #7. As a result, as illustrated in FIG. 9C, a state in which no load current flows through the primary side and the secondary side of the DC/DC converter 10 is formed. As the state illustrated in FIG. 9C, a state in which no load current flows through the primary side and the secondary side of the DC/DC converter 10 is formed.

Figure 9D:
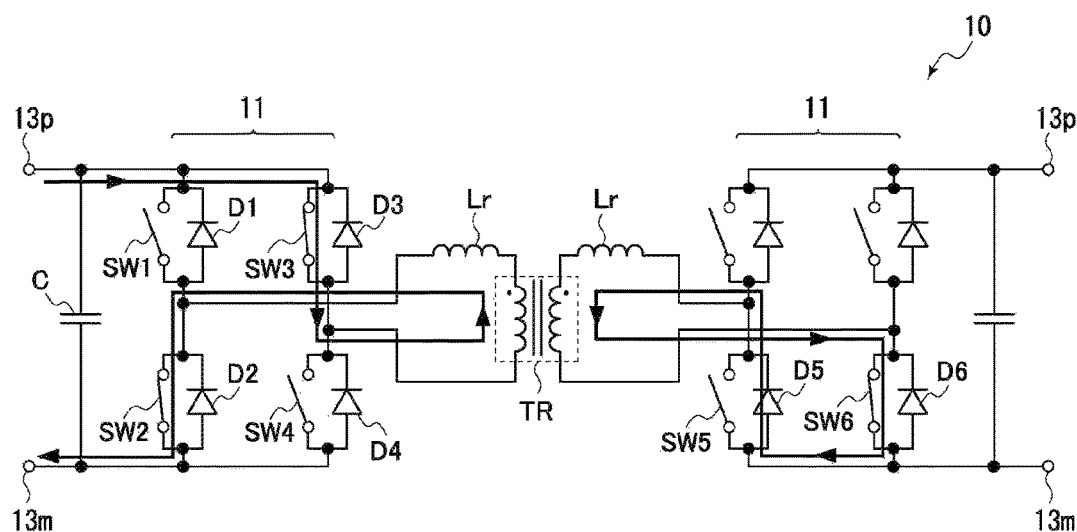
FIG. 9D is an explanatory diagram of the current paths of the primary side and the secondary side of the DC/DC converter following FIG. 9C.

When the state of the DC/DC converter 10 transitions from state #7 to state #8, as illustrated in FIG. 9D, a current flows through a path of first input/output terminal 13$p$→third switching element SW3→transformer TR→first reactor→second switching element SW2→first input/output terminal 13$m$. Accordingly, energy is stored in the first reactor (see FIG. 8), and energy is transmitted to the secondary side via the transformer TR. However, because the sixth switching element SW6 is ON, as illustrated in FIG. 9D, a current circulates along a path of diode D5→second reactor→transformer TR→sixth switching element SW6 on the secondary side of the DC/DC converter 10. Accordingly, in state #8, the energy from the primary side is stored in the second reactor.

Figure 9E:
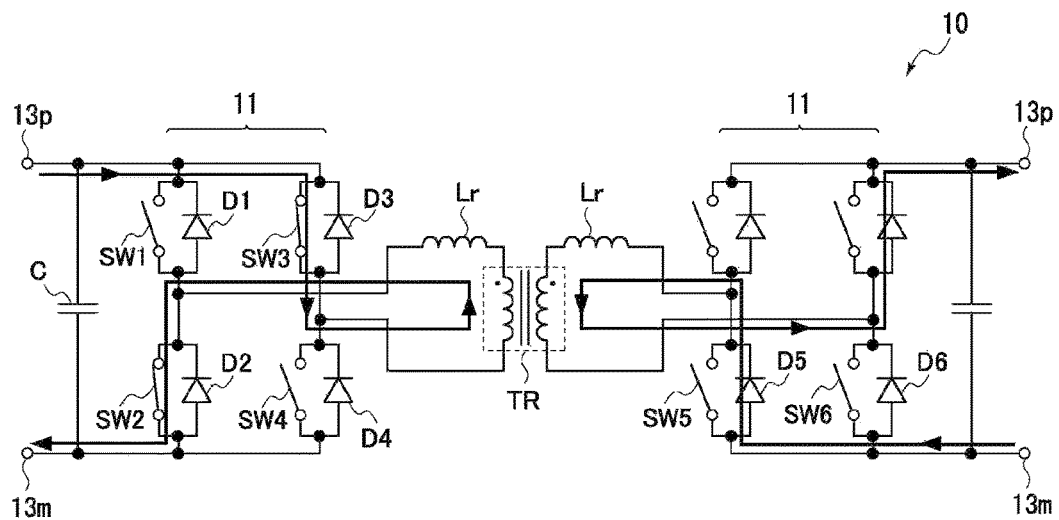
FIG. 9E is an explanatory diagram of the current paths of the primary side and the secondary side of the DC/DC converter following FIG. 9D.

If the sixth switching element SW6 is OFF and the state of the DC/DC converter 10 is shifted to state #9, energy stored in the second reactor and energy from the power supply are transmitted to the secondary side and a current rectified by the second full bridge circuit 11 is output from the second input/output terminal 13 as illustrated in FIG. 9E.

Figure 9F:
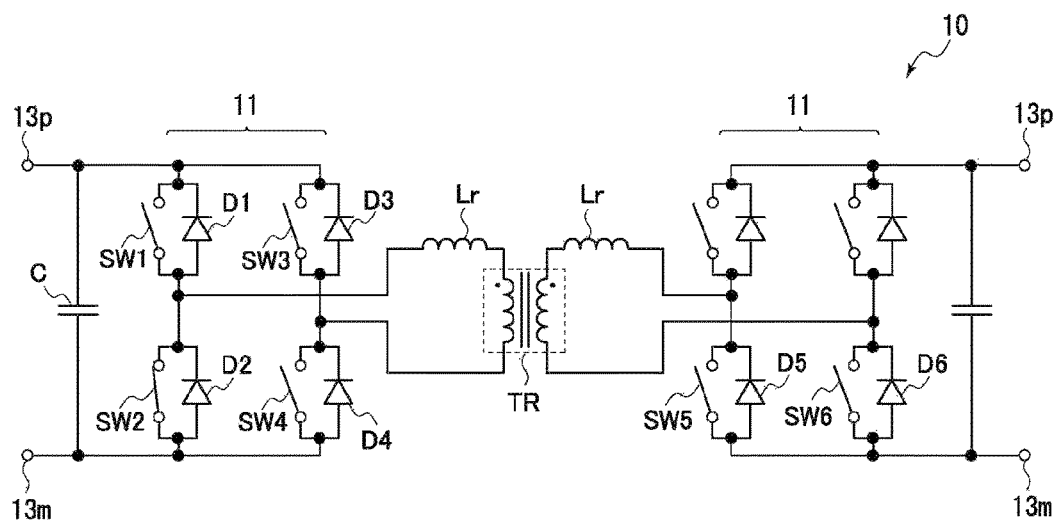
FIG. 9F is an explanatory diagram of the current paths of the primary side and the secondary side of the DC/DC converter following FIG. 9E.

An output voltage of a load is applied to the second input/output terminal 13. Thus, the input current, the input Lr current, and the output current in state #9 gradually decrease. Then, if the second Lr current value "0" is detected in step S209 (FIG. 7), the third switching element SW3 is turned OFF to be in state #10. Accordingly, when the state of the DC/DC converter 10 is state #10, as illustrated in FIG. 9F, a state in which no load current flows through the primary side and the secondary side of the DC/DC converter 10 is formed.

Hereinafter, an operation of the control unit 20 when the DC/DC converter 10 is operated as a step-up/step-down converter whose second input/output terminal 13 (the input/output terminal 13 illustrated on the right side of FIG. 1) is the primary side will be described.

Details of the control performed on the second and first full bridge circuits 11 by the control unit 20 when the DC/DC converter 10 is operated as the step-up/step-down converter whose second input/output terminal 13 side is the primary side are the same as details of the control performed on the first and second full bridge circuits 11 by the control unit 20 when the DC/DC converter 10 is operated as the step-up/step-down converter whose first input/output terminal 13 side is the primary side. However, a current sensor for measuring a value of a current flowing through the first reactor is not provided in the DC/DC converter 10 (FIG. 1). The current sensor 15 measures load current value+excitation current value of the primary side. Thus, in the above-described case, the control unit 20 is configured to calculate a load current value of the primary side from the current value measured by the current sensor 15 and control the timing of transition to various states on the basis of the calculation result.

Figure 10:
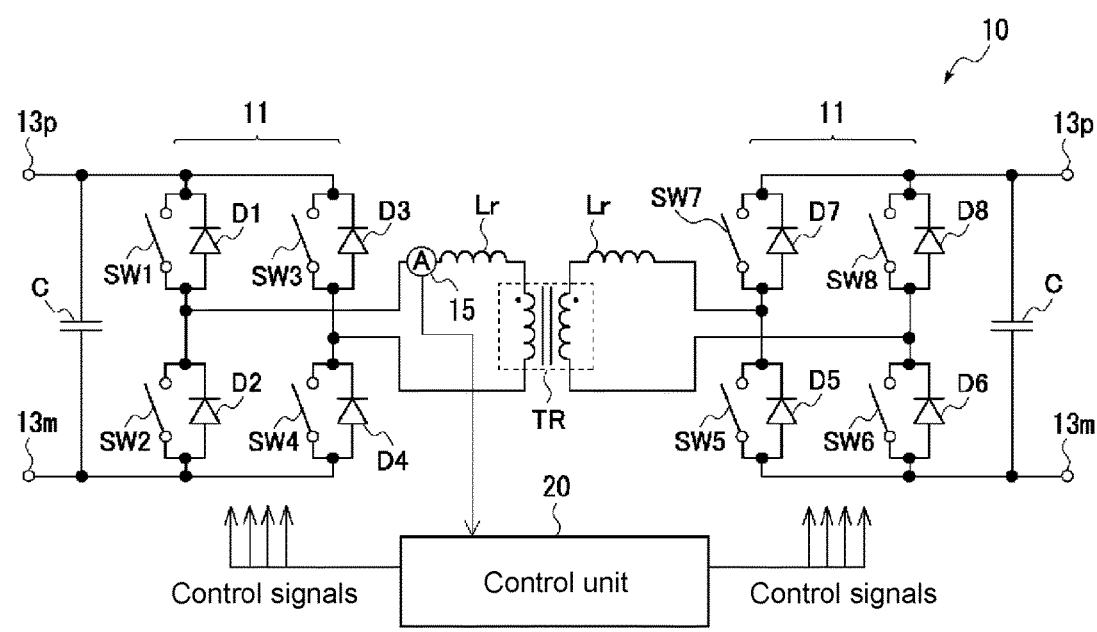
FIG. 10 is a schematic configuration diagram of the power conversion device illustrating details of control by the control unit.

Hereinafter, this will be more specifically described. Also, a state in which the second input/output terminal 13 side is the primary side is equivalent to a state in which the first input/output terminal 13 side is the primary side and the current sensor 15 is provided at a position illustrated in FIG. 10. Thus, instead of describing an operation of the control unit 20 in the above-described case, an operation of the control unit 20 when the DC/DC converter 10 illustrated in FIG. 10 is operated as the step-up/step-down converter whose first input/output terminal 13 side is the primary side will be described below.

Figure 11:
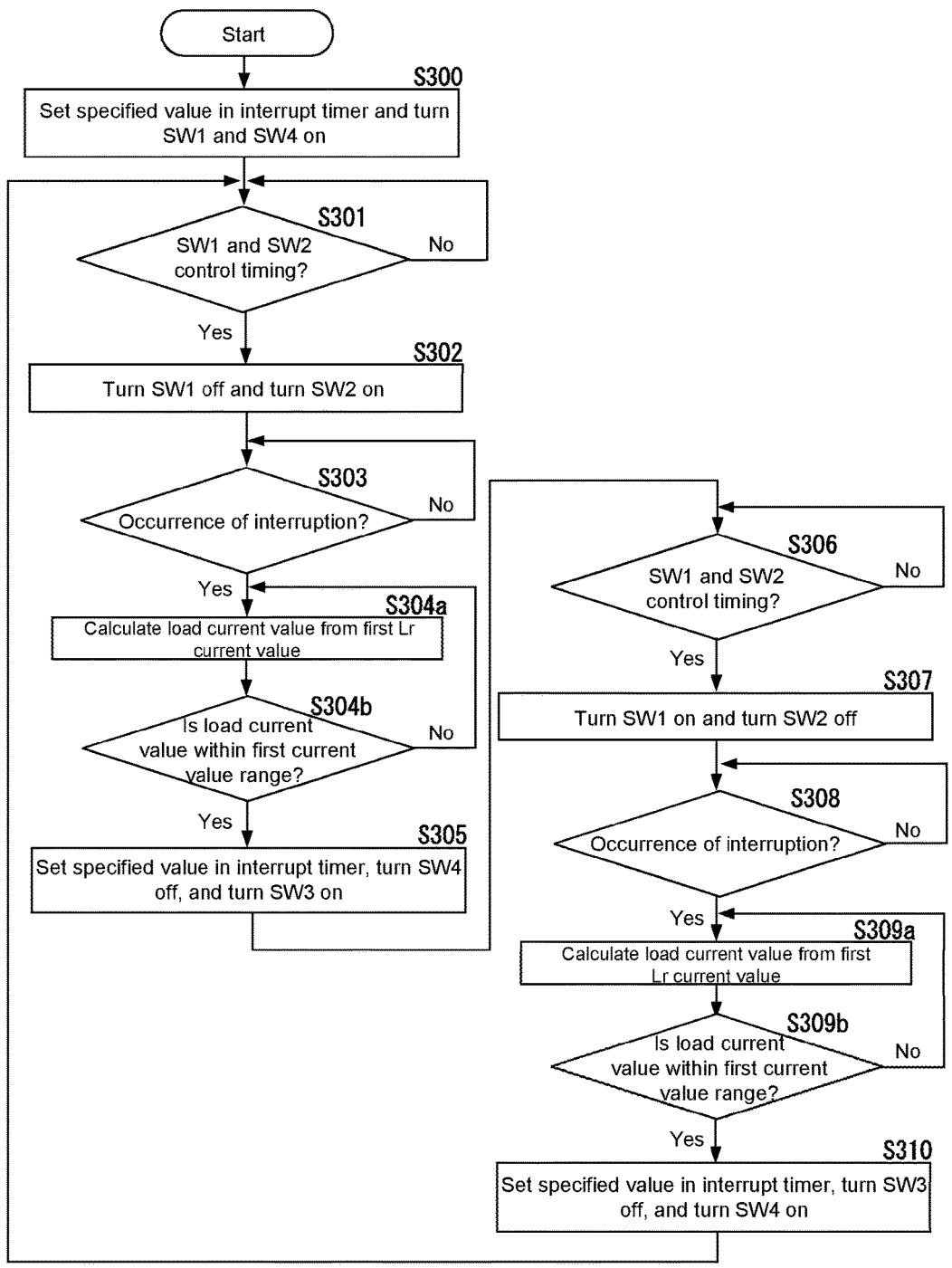
FIG. 11 is a flowchart of a second step-down control process to be executed by the control unit.

If the DC/DC converter 10 (FIG. 10) is operated as the step-up/step-down converter whose first input/output terminal 13 side is the primary side, the control unit 20 performs a second step-down control process of a procedure illustrated in FIG. 11 instead of the above-described step-down control process (FIG. 6).

The processing of steps S300 to S303, S305 to S308, and S310 of the second step-down control process is the same as the processing of steps S100 to S103, S105 to S108, and S110 of the above-described step-down control process.

The processing of step S304$a$ and S304$b$ is an alternative to the processing of step S104 and the processing of steps S309$a$ and S309$b$ is an alternative to the processing of step S109.

As illustrated, in step S304$a$, the control unit 20 calculates a load current value of the primary side from a first Lr current value which is a result of measuring a current value by the current sensor 15 (FIG. 10) arranged on the primary side of the DC/DC converter 10. The calculation of the load current value in step S304$a$ is performed normally by removing an excitation current component according to a voltage input to the DC/DC converter 10 from the first Lr current value. Here, the removal of the excitation current component is a process of performing an addition/subtraction operation between the excitation current value and the first Lr current value in consideration of a direction of the excitation current. However, the processing of step S304$a$ may be performed using a predetermined value as the magnitude of the excitation current component.

In the subsequent step S304$b$, the control unit 20 determines whether or not the calculated load current value is within the first current value range. As the first current value range in the second step-down control process, a range that is the same as the first current value range during the step-down control process (FIG. 6) is used if the turn ratio of the transformer TR is 1:1 and a range obtained by changing the first current value range during the step-down control process according to the turn ratio is used if the turn ratio of the transformer TR is not 1:1.

If the load current value is within the first current value range (step S304$b$; YES), the control unit 20 starts the processing of step S105 and steps subsequent thereto. If the load current value is not within the first current value range (step S304$b$; NO), the process returns to step S304$a$ to re-calculate the load current value.

In steps S309$a$ and S309$b$, the control unit 20 similarly calculates the load current value on the primary side from the first Lr current value, and determines whether or not the calculated load current value is within the first current value range. Then, if the load current value is within the first current value range (step S309$b$: YES), the control unit 20 starts the processing of step S110 and steps subsequent thereto. If the load current value is not within the first current value range (step S309$b$; NO), the process returns to step S309$a$ to re-calculate the load current value.

Figure 12:
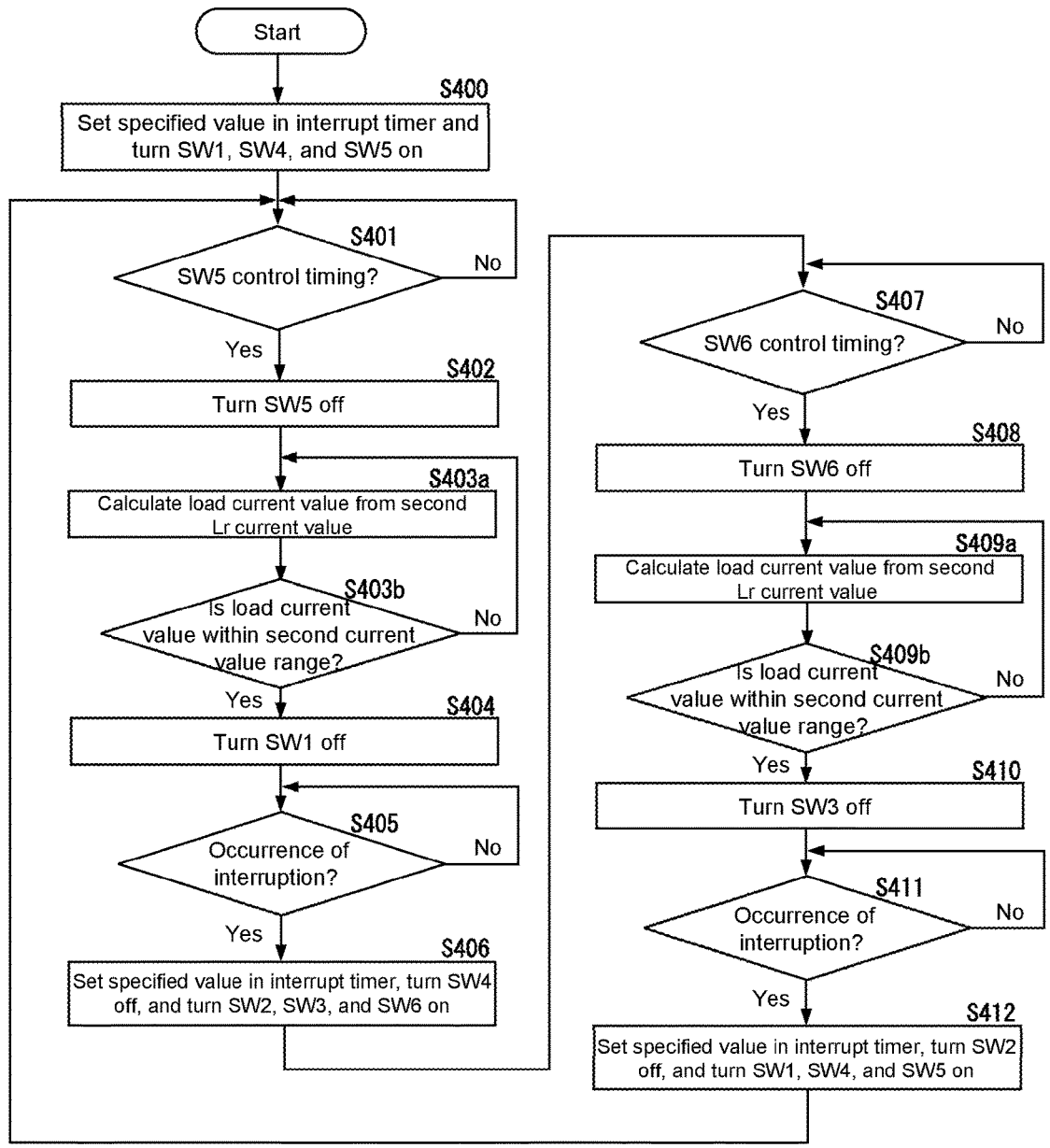
FIG. 12 is a flowchart of a second step-up control process to be executed by the control unit.

If the DC/DC converter 10 (FIG. 10) is operated as the step-down converter whose first input/output terminal 13 side is the primary side, the control unit 20 performs the second step-up control process of the procedure illustrated in FIG. 12 instead of the step-up control process (FIG. 7).

The processing of steps S400 to S402, S404 to S408, and S410 to S412 of the second step-up control process is the same as the processing of steps S200 to S202, S204 to S208, and S210 to S212 of the above-described step-up control process.

The processing of steps S403*a* and S403*b* is an alternative to the processing in step S203 and the processing of steps S409*a* and S409*b* is an alternative to the processing of step S209.

As illustrated, in steps S403*a* and S403*b*, the control unit 20 calculates the load current value on the primary side from the first Lr current value, and determines whether or not the calculated load current value is within the first current value range. If the load current value is within the second current value range (step S403*b*; YES), the control unit 20 starts the processing of step S404 and steps subsequent thereto. If the load current value is not within the second current value range (step S403*b*; NO), the process returns to step S403*a* to re-calculate the load current value.

Likewise, also in steps S409*a* and S409*b*, the control unit 20 calculates the load current value on the primary side from the first Lr current value and determines whether or not the calculated load current value is within the second current value range. Then, if the load current value is within the second current value range (step S409*b*: YES), the control unit 20 starts the processing of step S410 and steps subsequent thereto. If the load current value is not within the second current value range (step S409*b*; NO), the process returns to step S409*a* to re-calculate the load current value.

As described above, in the power conversion device according to the present embodiment, the transition from the second state to the third state and the transition from the fourth state to the first state at the step-down time are performed when a load current value of the primary or secondary side has reached a value within the first current value range. Also, the transition from the sixth state to the seventh state and the transition from the ninth state to the tenth state for the step-up time are performed when the load current value of the primary or secondary side has reached a value within the second current value range. For the DC/DC converter 10, it is effective to reduce a load current value at the time of transition from the second state to the third state, a load current value at the time of transition from the fourth state to the first state, a load current value at the time of transition from the sixth state to the seventh state, and a load current value at the time of transition from the ninth state to the tenth state so as to improve a speed of switching a power transmission direction of the power conversion device in which a control for causing the state of the DC/DC converter 10 to iteratively transition between the first to fourth states and a control for causing the state of the DC/DC converter 10 to iteratively transition between the fifth to tenth states are performed. Accordingly, the power conversion device of the present invention can switch the power transmission direction at a high speed (in a short time) as compared with a conventional power conversion device.

Modified Embodiments

The power conversion device according to the above-described embodiment can have various modifications. For example, the determinations of steps S104 and S109 in the step-down control process (FIG. 6) may change to a determination of whether or not the second Lr current value is "0." Also, the determinations of steps S203 and S209 in the step-up control process (FIG. 7) may change to a determination of whether or not the second Lr current value is "0." The determinations of steps S304*b* and S309*b* in the second step-down control process (FIG. 11) may change to a determination of whether or not the load current value is "0." Also, the determinations of steps S403*b* and S409*b* in the second step-up control process (FIG. 12) may change to a determination of whether or not the load current value is "0."

If the determinations of the above-described steps change to such determinations, it is possible to obtain a power conversion device in which a power transmission direction can be switched at a particularly high speed. Also, it is not necessary for a determination of whether or not the current value is "0" to be a determination of whether or not the current value has completely reached "0." It is only necessary for the above-described determination to be a determination of whether or not the current value is within a detectable minimum current value range determined by performance or the like of the current sensor 15.

It is only necessary for the power conversion device to have a function of converting a voltage within the first range applied between the first input/output terminals 13 into a voltage within the second range and outputting the voltage from the second input/output terminal 13 and a function of converting a voltage within the second range applied between the second input/output terminals 13 into a voltage within the first range and outputting the voltage from the first input/output terminal 13. Accordingly, according to a combination of the first range and the second range, a unit having only a function of causing the DC/DC converter 10 to operate as a step-up (or step-down) converter whose first input/output terminal 13 side is the primary side or a step-down (or step-up) converter whose second input/output terminal 13 side is the primary side may be adopted as the control unit 20.

Also, the procedure of the control of the DC/DC converter 10 by the control unit 20 need not be the same as that described above. For example, although the control unit 20 ascertains a control timing with a so-called software interruption, the control unit 20 that ascertains a control timing by a hardware interruption and re-sets the hardware interruption when it waits for the second Lr current value to be a value within the second current value range may be adopted.

Figure 13:
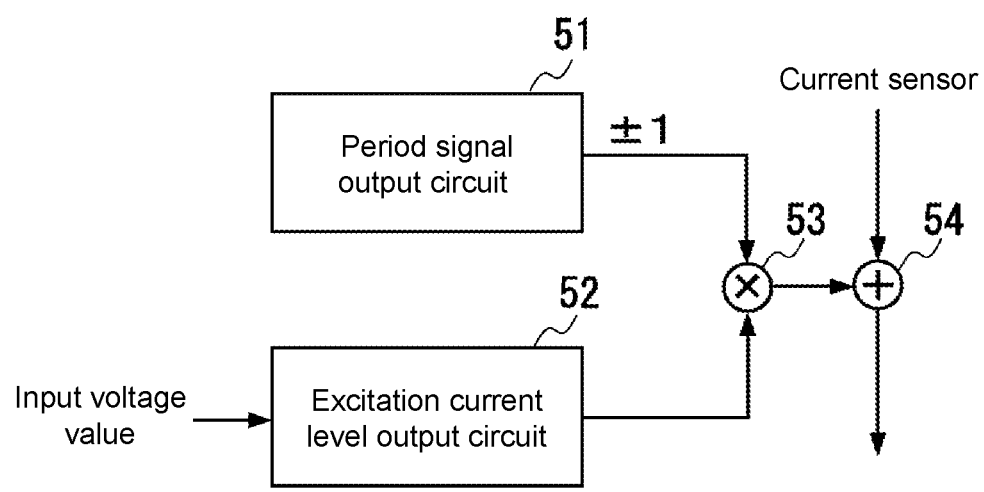
FIG. 13 is an explanatory diagram of a configuration of a load current generation circuit.

A load current value calculation circuit that calculates a load current value from a result of measuring a current value by the current sensor 15 may be included in the control unit 20. As this load current value calculation circuit, a circuit of a configuration illustrated in FIG. 13 can be exemplified. A period signal output circuit 51 provided in the load current value calculation circuit is a circuit that alternately outputs 1 and −1 in synchronization with a control period for the DC/DC converter 10. An excitation current level output circuit 52 is a circuit that outputs an excitation current level (>0) indicating a magnitude of the excitation current on the basis of an input voltage value for the power conversion device. A multiplier 53 is a circuit that outputs a result of multiplying a period signal from the period signal output circuit 51 by an excitation current level from the excitation current level output circuit 52 and an adder 54 is a circuit that outputs a value (i.e., a load current value) obtained by subtracting an output of the multiplier 53 from a result of measuring the current value by the current sensor 15.

The control unit 20 may be modified to perform the second step-up control process and the second step-down control process by providing the current sensor 15 for measuring a magnitude of the current flowing through the first reactor in the DC/DC converter 10. However, the performance of the power conversion device is not improved by such a modification and it is preferable that the necessary number of current sensors 15 in the power conversion device is small. Accordingly, it is preferable to adopt the configuration of the power conversion device of the above-described embodiment.

What is claimed is:

1. A power conversion device, comprising:
a first input/output terminal pair;
a second input/output terminal pair;
a DC/DC converter connected to the first input/output terminal pair and the second input/output terminal pair; and
a control unit configured to control the DC/DC converter, wherein the DC/DC converter comprises:
a first switching leg having first and second switching elements connected in series via a first connection point and connected to the first input/output terminal pair;
a second switching leg having third and fourth switching elements connected in series via a second connection point and connected in parallel to the first switching leg;
a third switching leg having fifth and seventh switching elements connected in series via a third connection point and connected to the second input/output terminal pair;
a fourth switching leg having sixth and eighth switching elements connected in series via a fourth connection point and connected in parallel to the third switching leg;
a first energy storage and conversion unit connected to the first connection point and the second connection point and connected to one winding of a transformer and a first reactor connected in series; and
a second energy storage and conversion unit connected to the third connection point and the fourth connection point and connected to the other winding of the transformer and a second reactor connected in series,
wherein the control unit is able to execute a first control for causing the DC/DC converter to convert a voltage within a first range applied to the first input/output terminal pair into a voltage within a second range and to output the voltage within the second range from the second input/output terminal pair and a second control for causing the DC/DC converter to convert a voltage within the second range applied to the second input/output terminal pair into a voltage within the first range and to output the voltage within the first range from the first input/output terminal pair,
wherein the first control is a control for controlling ON/OFF of each switching element in the DC/DC converter so that a state of the DC/DC converter iteratively transitions between, in an order of, a first state in which a current input from the first input/output terminal pair flows through the first reactor, a second state in which a current is able to circulate along a path including the first reactor, a third state in which the current input from the first input/output terminal pair flows through the first reactor in a direction opposite to a direction in the first state, and a fourth state in which a current is able to circulate along a path including the first reactor while flowing through the first reactor in a direction opposite to a direction in the second state, and is a control for causing the state of the DC/DC converter to transition from the second state to the third state after a second reactor current value, which is a result of measuring a value of a current flowing through the second reactor, is within a first current value range if the second reactor current value is not within the first current value range when the state of the DC/DC converter is to be transitioned from the second state to the third state and causing the state of the DC/DC converter to transition from the fourth state to the first state after the second reactor current value is within the first current value range if the second reactor current value is not within the first current value range when the state of the DC/DC converter is to be transitioned from the fourth state to the first state, and wherein the second control is a control for controlling ON/OFF of each switching element in the DC/DC converter so that a state of the DC/DC converter iteratively transitions between, in an order of, a fifth state in which a current input from the second input/output terminal pair flows through the second reactor and no current is output from the first input/output terminal pair, a sixth state in which the current input from the second input/output terminal pair flows through the second reactor and a current is output from the first input/output terminal pair, a seventh state in which no current is input from the second input/output terminal pair and no current is output from the first input/output terminal pair, an eighth state in which the current input from the second input/output terminal pair flows through the second reactor in a direction opposite to a direction in the fifth state and no current is output from the first input/output terminal pair, a ninth state in which the current input from the second input/output terminal pair flows through the second reactor in a direction opposite to a direction in the sixth state and a current is output from the first input/output terminal pair, and a tenth state in which no current is input from the second input/output terminal pair and no current is output from the first input/output terminal pair, and is a control for causing the state of the DC/DC converter to transition from the sixth state to the seventh state after a load current value, which is a value of a current flowing through the first reactor, obtained from the second reactor current value is within a second current value range if the load reactor current value is not within the second current value range when the state of the DC/DC converter is to be transitioned from the sixth state to the seventh state and causing the state of the DC/DC converter to transition from the ninth state to the tenth state after the load current value is within the second current value range if the load current value is not within the second current value range when the state of the DC/DC converter is to be transitioned from the ninth state to the tenth state.

2. The power conversion device according to claim 1, wherein the control unit includes a load current value output circuit configured to generate the load current value from the second reactor current value, an input voltage to the first input/output terminal, and a control period of the second control, and output the load current value.

3. A power conversion device, comprising:
a first input/output terminal pair;
a second input/output terminal pair;
a DC/DC converter connected to the first input/output terminal pair and the second input/output terminal pair; and
a control unit configured to control the DC/DC converter, wherein the DC/DC converter comprises:
a first switching leg having first and second switching elements connected in series via a first connection point and connected to the first input/output terminal pair;

a second switching leg having third and fourth switching elements connected in series via a second connection point and connected in parallel to the first switching leg;

a third switching leg having fifth and seventh switching elements connected in series via a third connection point and connected to the second input/output terminal pair;

a fourth switching leg having sixth and eighth switching elements connected in series via a fourth connection point and connected in parallel to the third switching leg;

a first energy storage and conversion unit connected to the first connection point and the second connection point and connected to one winding of a transformer and a first reactor connected in series; and a second energy storage and conversion unit connected to the third connection point and the fourth connection point and connected to the other winding of the transformer and a second reactor connected in series, wherein the control unit is able to execute a first control for causing the DC/DC converter to convert a voltage within a first range applied to the first input/output terminal pair into a voltage within a second range and to output the voltage within the second range from the second input/output terminal pair and a second control for causing the DC/DC converter to convert a voltage within the second range applied to the second input/output terminal pair into a voltage within the first range and to output the voltage within the first range from the first input/output terminal pair, wherein the second control is a control for controlling ON/OFF of each switching element in the DC/DC converter so that a state of the DC/DC converter iteratively transitions between, in an order of, a fifth state in which a current input from the second input/output terminal pair flows through the second reactor and no current is output from the first input/output terminal pair, a sixth state in which the current input from the second input/output terminal pair flows through the second reactor and a current is output from the first input/output terminal pair, a seventh state in which no current is input from the second input/output terminal pair and no current is output from the first input/output terminal pair, an eighth state in which the current input from the second input/output terminal pair flows through the second reactor in a direction opposite to a direction in the fifth state and no current is output from the first input/output terminal pair, a ninth state in which the current input from the second input/output terminal pair flows through the second reactor in a direction opposite to a direction in the sixth state and a current is output from the first input/output terminal pair, and a tenth state in which no current is input from the second input/output terminal pair and no current is output from the first input/output terminal pair, and is a control for causing the state of the DC/DC converter to transition from the sixth state to the seventh state after a second reactor current value, which is a result of measuring a value of a current flowing through the second reactor, is within a second current value range if the second reactor current value is not within the second current value range when the state of the DC/DC converter is to be transitioned from the sixth state to the seventh state and causing the state of the DC/DC converter to transition from the ninth state to the tenth state after the second reactor current value is within the second current value range if the second reactor current value is not within the second current value range when the state of the DC/DC converter is to be transitioned from the ninth state to the tenth state, and wherein the first control is a control for controlling ON/OFF of each switching element in the DC/DC converter so that a state of the DC/DC converter iteratively transitions between, in an order of, a first state in which a current input from the first input/output terminal pair flows through the first reactor, a second state in which a current is able to circulate along a path including the first reactor, a third state in which the current input from the first input/output terminal pair flows through the first reactor in a direction opposite to a direction in the first state, and a fourth state in which a current is able to circulate along a path including the first reactor while flowing through the first reactor in a direction opposite to a direction in the second state, and is a control for causing the state of the DC/DC converter to transition from the second state to the third state after a load current value, which is a current flowing through the first reactor, obtained from the second reactor current value is within a first current value range if the load current value is not within the first current value range when the state of the DC/DC converter is to be transitioned from the second state to the third state and causing the state of the DC/DC converter to transition from the fourth state to the first state after the load current value is within the first current value range if the load current value is not within the first current value range when the state of the DC/DC converter is to be transitioned from the fourth state to the first state.

4. The power conversion device according to claim 2, wherein the control unit includes a load current value output circuit configured to generate the load current value from the first reactor current value, an input voltage to the second input/output terminal, and a control period of the first control, and output the load current value.

* * * * *